(12) United States Patent
Dalli et al.

(10) Patent No.: US 11,900,236 B2
(45) Date of Patent: Feb. 13, 2024

(54) INTERPRETABLE NEURAL NETWORK

(71) Applicant: UMNAI Limited, Ta' Xbiex (MT)

(72) Inventors: Angelo Dalli, Floriana (MT); Mauro Pirrone, Kalkara (MT)

(73) Assignee: UMNAI Limited, Ta' Xbiex (MT)

( * ) Notice: Subject to any disclaimer, the term of this patent is extended or adjusted under 35 U.S.C. 154(b) by 54 days.

(21) Appl. No.: 17/519,217

(22) Filed: Nov. 4, 2021

(65) Prior Publication Data

US 2022/0138532 A1 May 5, 2022

Related U.S. Application Data

(60) Provisional application No. 63/109,990, filed on Nov. 5, 2020.

(51) Int. Cl.
  *G06N 3/042* (2023.01)
  *G06N 5/045* (2023.01)
  *G06N 3/048* (2023.01)

(52) U.S. Cl.
  CPC ............. *G06N 3/042* (2023.01); *G06N 3/048* (2023.01); *G06N 5/045* (2013.01)

(58) Field of Classification Search
  CPC ......... G06N 5/025; G06N 5/045; G06N 5/022
  See application file for complete search history.

(56) References Cited

U.S. PATENT DOCUMENTS

2019/0370647 A1* 12/2019 Doshi ................ G06N 3/08

OTHER PUBLICATIONS

Townsend et al., Extracting Relational Explanations From Deep Neural Networks: A Survey From a Neural-Symbolic Perspective, Nov. 1, 2019 (Year: 2019).*
Wu et al., Edge Detection Based on Spiking Neural Network Model, 2007 (Year: 2007).*
Gunning et al., DARPA's Explainable Artificial Intelligence Program, 2019, AI Magazine pp. 44-58 (Year: 2019).*
Chabanne et al., Privacy-Preserving Classification on Deep Neural Network, 2017 (Year: 2017).*
Cannici et al., Asynchronous Convolutional Networks for Object Detection in Neuromorphic Cameras, 2019 (Year: 2019).*
Kraus et al., Decision Support From financial Disclosures With Deep Neural Networks and Transfer Learning, 2017, Decision Support Systems, pp. 38-48 (Year: 2017).*
Voogd et al., Using Relational Concept Networks for Explainable Decision Support, 2019, Machine Learning and Knowledge Extraction, pp. 78-93 (Year: 2019).*
Gama, Fernando et al., Hierarchical Overlapping Clustering of Network Data Using Cut Metrics, May 23, 2017, IEEE Transactions on Signal and Information Processing Over Networks, vol. 4, No. 2, Jun. 2018 (Year: 2017).*
Arrieta et al., Explainable Artificial Intelligence (XAI): Concepts, taxonomies, opportunities and challenges toward responsible AI, 2019 (Year: 2019).*

* cited by examiner

*Primary Examiner* — Ann J Lo
*Assistant Examiner* — Charles C Kuo
(74) *Attorney, Agent, or Firm* — Maier & Maier, PLLC

(57) ABSTRACT

An exemplary embodiment may provide an interpretable neural network with hierarchical conditions and partitions. A local function f(x) may model the feature attribution within a specific partition. The combination of all the local functions creates a globally interpretable model. Further, INNs may utilize an external process to identify suitable partitions during their initialization and may support training using back-propagation and related techniques.

30 Claims, 19 Drawing Sheets

INTERPRETABLE NEURAL NETWORK

FIELD

An exemplary embodiment relates to the field of interpretable neural networks.

BACKGROUND

Attribution methods may offer instance-level feature importance proportional to the feature's contribution to the model's prediction. Current attribution methods fall under one of two categories:

The first category refers to gradient-based attribution methods, such as: sensitivity analysis, integrated gradients, Layer-Wise Relevance Propagation (LRP), Gradient*Input, SmoothGrad and DeepLIFT, DeConvNet The second category may involve perturbations to inputs and/or activations, such as methods involving Shapley Values, Occlusion, LIME, and Feedback Gradient-based methods may require the propagation of one forward and/or backward pass through the network in order to generate the feature attributions, also sometimes referred to as relevance. The primary advantage of gradient-based methods is that they are fast since they might only require one or a few passes through the network to produce the feature attribution map. While many algorithms may share the same concept, the difference between the different methods may be found in how they compute the gradient. For instance, the attribution $R_i^c(x)$ may be calculated as follows:

| Method | Attribution $R_i^c(x)$ |
| --- | --- |
| Sensitivity analysis | $\left\|\frac{\delta S_c(x)}{\delta(x_i)}\right\|$ |
| Gradient * Input | $x_i \cdot \frac{\delta S_c(x)}{\delta(x_i)}$ |
| LRP | $x_i \cdot \frac{\delta^g S_c(x)}{\delta(x_i)}, g = \frac{f(z)}{z}$ |
| DeepLIFT | $(x_i - \bar{x}_i) \, x_i \cdot \frac{\delta^g S_c(x)}{\delta(x_i)}, g = \frac{f(z) - f(\bar{z})}{z - \bar{z}}$ |

Another advantage of gradient-based methods is that they can be implemented easily. Since most deep learning libraries have efficient gradient implementation on GPUs, they are inherently easy to deploy and use on extremely large models, without the need to implement custom layers or operations.

Gradient-based methods have an inherent limitation; they are strongly affected by noisy gradients which typically cause neighboring features to be inconsistent. For example, in the case of convolutional neural networks, one pixel may be attributed high-importance and a nearby pixel assigned an opposite weight, or a very different attribution/relevance. This phenomenon violates explanation continuity. This problem has been tackled in more recent adaptations of similar algorithms to obtain a smoother result. For example, in a variation of the original LRP algorithm as shown in FIG. 1, αβ-LRP employs a backpropagation rule where positive and negative information paths are weighted to two different parameters, chosen by the user.

Perturbation-based methods assign attributions for each input feature without taking into consideration the inner structure of the model. One perturbation method is LIME. With LIME, a black-box system is explained by probing behavior on perturbations of an input, and then that data is used to construct a local linear model that serves as a simplified proxy for the full model in the neighborhood of the input. (Gilpin, et al., 2019). The resulting output from LIME is a set of features and weights which locally explain which features are most important for that specific prediction.

A major limitation of perturbation methods is that the number of features that are perturbated at each iteration, as well as the chosen perturbation technique, can significantly affect the resulting explanations. Also, perturbation methods tend to be slower than gradient-based methods as they require more processing for each input sample.

Finally, interpretable models are designed to be explainable through the architecture of the neural network itself, without the need to apply complex processing to get explanations for a given input sample. The Self-Explaining Neural Network (SENN) architecture (Alvarez-Melis and Jaakkola, 2018) shown in FIG. 2, includes three components: a concept encoder 202 that transforms the input into a small set of interpretable basis features; an input-dependent parametrizer 204 that generates relevance scores; and an aggregation function 206 that combines to produce a prediction. The robustness loss on the parametrizer encourages the full model to behave locally as a linear function on h(x) with parameters θ(x), yielding immediate interpretation of both concepts and relevancies. The resulting prediction may be defined as a linear function $f: X \to y$ such that:

$$f(x) = g(\theta_1(x) h_1(x), \ldots, \theta_k(x) h_k(x))$$

Where g is the aggregator function which generates the result and k refers to the total number of concepts modeled by the neural network. For a give input sample x, the explanation (or concept attribution) of $f(x)$ may be defined as:

$$\varepsilon_f \equiv \{\theta_i(x) h_i(x)\}_{i=1}^k$$

FIG. 3, from (Alvarez-Melis and Jaakkola, 2018), shows the output from SENN and how it is compares with gradient-based methods and perturbation-based methods. The SENN focuses on generating explanations using high-level abstract features, as opposed to raw inputs, which are encoded by $h_i(x)$. SENN, unlike proxy-based methods and like INNs, modify the existing architecture, instead of relying on reverse-engineering feature attributions or relevance of input features.

SUMMARY

According to at least one exemplary embodiment, a method, computer program product, and system for an interpretable neural network may be shown and described.

Artificial Neural Networks (ANNs) may be applied to complex tasks involving finding possibly complicated relationships between a set of inputs and outputs. A resurgence of useful AI algorithms that may outperform humans has been fueled by the application of gradient descent and backpropagation-based methods, such as deep learning (DL). Despite their success, ANNs lack transparency due to their inherent black-box architecture, leading to lack of trust, hidden biases, and over-dependency on training data without any guidance or insight as to how the model reaches conclusions.

An exemplary embodiment may provide an architecture where the interpretability of the neural network is designed in the architecture itself. An exemplary interpretable neural network (INN) architecture may automatically generate an explanation using existing deep learning techniques. INNs may utilize existing software infrastructures and hardware used for neural networks and can also remain fully compatible with backpropagation training techniques.

The INN architecture may include a feature transformer which converts the input to some hidden features, and a number of relevance estimators which transform the hidden features to feature weights. The feature weights may be combined with the transformed input in order to extract the attribution of each input transformed feature. The resulting feature attributions may be aggregated for the result. Feature attribution may be extracted at different levels. In the simplest form, attribution may be linked directly with the original inputs. In other cases, such as with convolutional neural networks (CNN), feature attribution may also be computed for higher-level features which may be found in kernels and filters. Additionally, INNs may split the model into various partitions, thus enabling a higher-level of flexibility and interpretability, by enabling a mixture of local or segmented explainability. In some cases, INNs are also capable of providing global explainability.

An exemplary embodiment may adapt and scale to existing Deep Neural Networks (DNNs) and ANNs in general. Through transfer learning, knowledge in the original black-box network may be decoded such that the INN can generate an explanation along with a prediction.

INNs may be compatible with a universal format for explainable AI (XAI) explanation encoding and transmission. INNs may also be compatible with explainable technologies, such as induced XAI models, explainable neural networks (XNNs), explainable transducer transformers (XTTs), explainable spiking nets (XSN), explainable memory nets (XMN), and the like, as well as reinforcement learning applications where they may be compatible with explainable reinforcement learning (XRL).

Various embodiments of an exemplary architecture may be contemplated. An exemplary embodiment may be applied to, for example, standard feed forward networks, CNNs, recurrent neural networks (RNNs), long-short-term memory networks (LSTMs) and various different combinations and configurations.

INNs may represent the link between a fully black-box architecture, such as those found in ANNs and DNNs and other neural network variants, and a fully white-box architecture such as XNNs. INNs effectively extend the repertoire of black-box networks and predictors giving them many useful attributes of a white-box model, making the resulting INN interpretable and explainable in general. An INN may be considered a grey-box model, as it seamlessly blends a black-box model with white-box features, making it a useful intermediate solution that compliments the full white-box solution, such as a model provided by an exemplary XAI induction method. A model of a black-box AI may be an input to the model induction method, along with a set of sample input data, such as training data or synthetically generated data. The model induction method may perturbate the input data in a variety of ways, and the perturbated data may be merged with the sample input data. Next, a predictor function may be used to predict the output of the black-box model. The predictor function may be linear or non-linear. A set of data points may be created by the predictor function. The data points may be partitioned by a partitioning function, such that a partition of data points may represent one or more rules.

The partitioned data points may be filtered. A local model may be fitted to each partition. The local model may be linear. The data may also be transformed using a number of transformation functions, such as a polynomial expansion. A local model may be fitted to the transformed function or functions. Finally, the transformed and fitted functions may be interpreted by the model to form rules which can be presented in symbolic logic.

The resulting set of rules may form a white-box AI model. The white-box model may be smaller in size and require less processing power to operate, as compared to the originating black-box model. Thus, the white-box model may operate as fast as or faster than the black-box model without sacrificing accuracy. Linear or non-linear data may be modeled by the white-box model. Further, the white-box model may be implemented on a low-power device and may not require internet connectivity.

BRIEF DESCRIPTION OF THE FIGURES

Advantages of embodiments of the present invention will be apparent from the following detailed description of the exemplary embodiments thereof, which description should be considered in conjunction with the accompanying drawings in which like numerals indicate like elements, in which.

DETAILED DESCRIPTION

Figure 1:
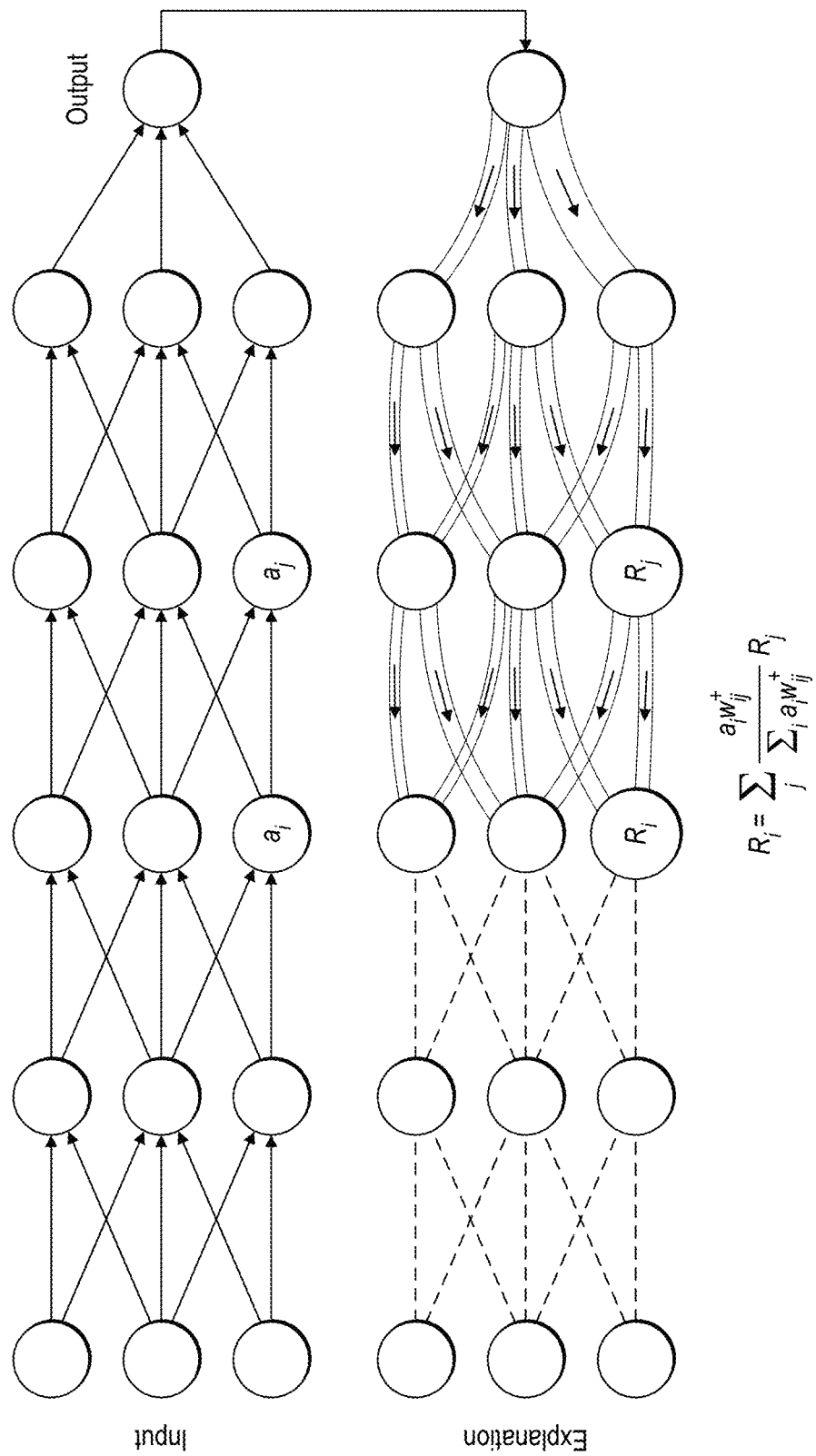
FIG. 1 is an exemplary embodiment of a layer-wise relevance propagation.
Figure 2:
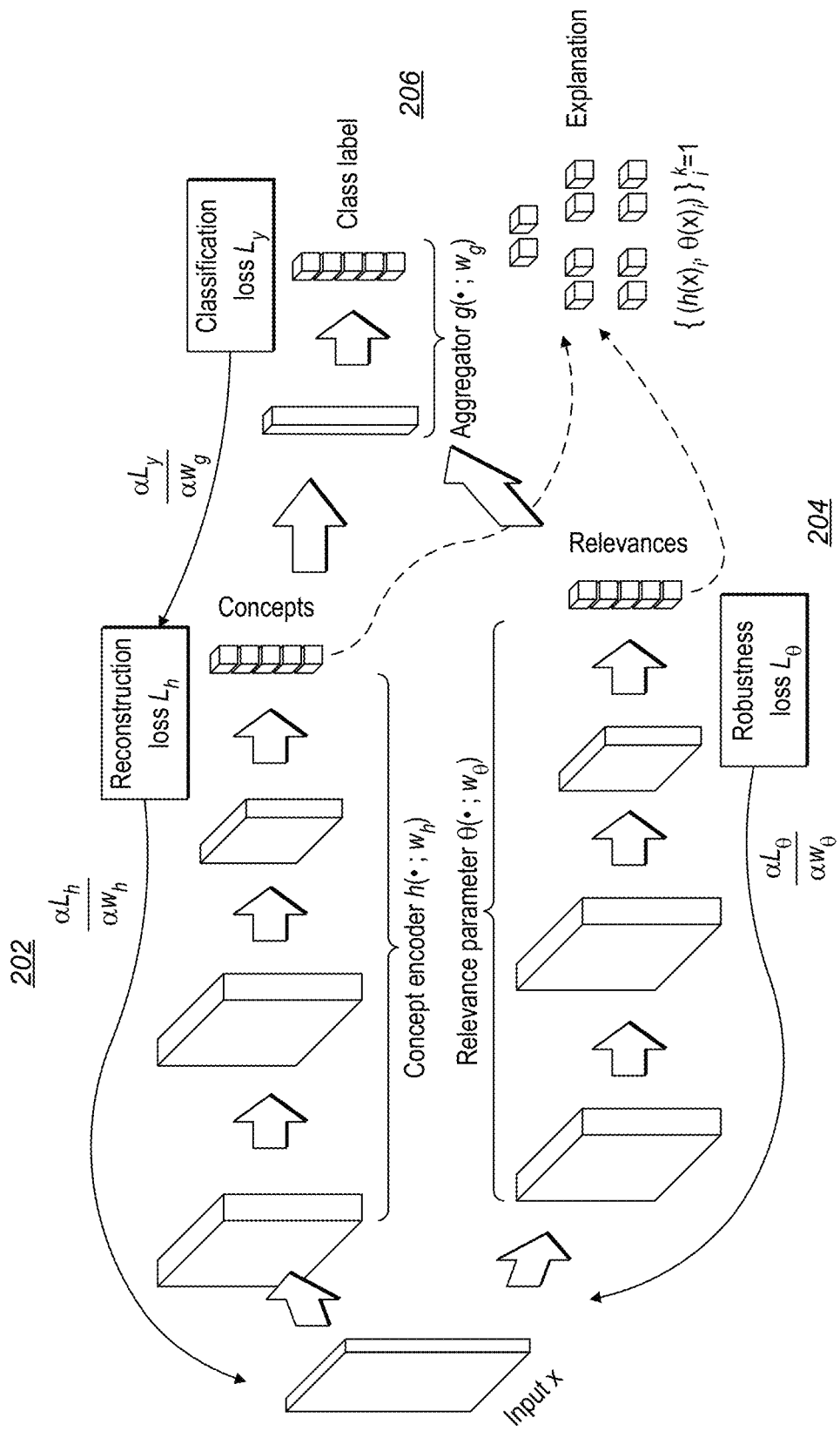
FIG. 2 is an exemplary embodiment of a self-explainable neural network (SENN)
Figure 3:
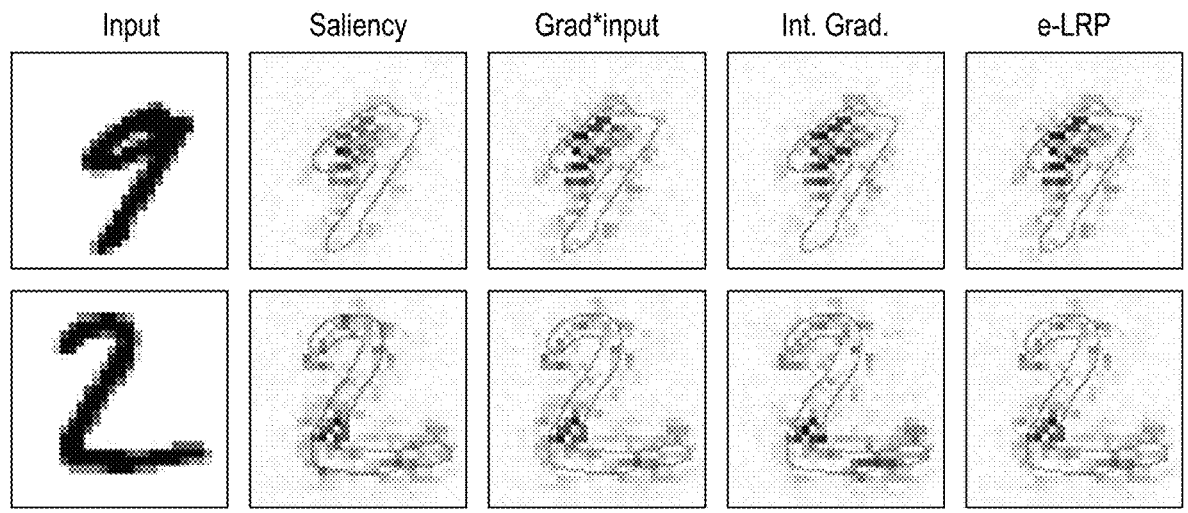
FIG. 3 is an exemplary comparison of feature attributions.
Figure 3:
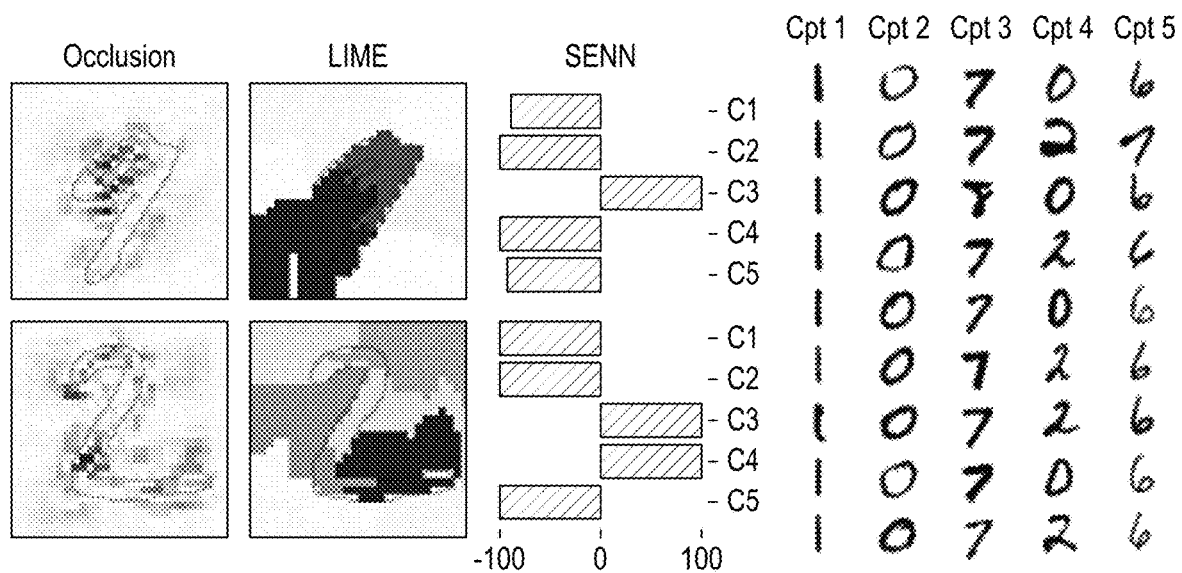

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage, or mode of operation.

Further, many of the embodiments described herein are described in terms of sequences of actions to be performed by, for example, elements of a computing device. It should be recognized by those skilled in the art that the various sequences of actions described herein can be performed by specific circuits (e.g., application specific integrated circuits (ASICs)) and/or by program instructions executed by at least one processor. Additionally, the sequence of actions described herein can be embodied entirely within any form of computer-readable storage medium such that execution of the sequence of actions enables the at least one processor to perform the functionality described herein. Furthermore, the sequence of actions described herein can be embodied in a combination of hardware and software. Thus, the various aspects of the present invention may be embodied in a number of different forms, all of which have been contemplated to be within the scope of the claimed subject matter. In addition, for each of the embodiments described herein, the corresponding form of any such embodiment may be described herein as, for example, "a computer configured to" perform the described action.

Interpretable Neural Networks (INNs) may be considered interpretable models, while eXplainable Neural Networks (XNNs) may be both interpretable and explainable models.

The terms interpretable and explainable may have different meanings. Interpretability may be a characteristic that may need to be defined in terms of an interpreter. The interpreter may be an agent that interprets the system output or artifacts using a combination of (i) its own knowledge and beliefs; (ii) goal-action plans; (iii) context; and (iv) the world environment. An exemplary interpreter may be a knowledgeable human.

An alternative to a knowledgeable human interpreter may be a suitable automated system, such as an expert system in a narrow domain, which may be able to interpret outputs or artifacts for a limited range of applications. For example, a medical expert system, or some logical equivalent such as an end-to-end machine learning system, may be able to output a valid interpretation of medical results in a specific set of medical application domains.

It may be contemplated that non-human Interpreters may be created in the future that can partially or fully replace the role of a human Interpreter, and/or expand the interpretation capabilities to a wider range of application domains.

There may be two distinct types of interpretability: (i) model interpretability, which measures how interpretable any form of automated or mechanistic model is, together with its sub-components, structure, and behavior; and (ii) output interpretability which measures how interpretable the output from any form of automated or mechanistic model is.

Interpretability thus might not be a simple binary characteristic but can be evaluated on a sliding scale ranging from fully interpretable to un-interpretable. Model interpretability may be the interpretability of the underlying embodiment, implementation, and/or process producing the output, while output interpretability may be the interpretability of the output itself or whatever artifact is being examined.

A machine learning system or suitable alternative embodiment may include a number of model components. Model components may be model interpretable if their internal behavior and functioning can be fully understood and correctly predicted, for a subset of possible inputs, by the interpreter. In an embodiment, the behavior and functioning of a model component can be implemented and represented in various ways, such as a state-transition chart, a process flowchart or process description, a Behavioral Model, or some other suitable method. Model components may be output interpretable if their output can be understood and correctly interpreted, for a subset of possible inputs, by the interpreter.

An exemplary machine learning system or suitable alternative embodiment may be (i) globally interpretable if it is fully model interpretable (i.e., all of its components are model interpretable), or (ii) modular interpretable if it is partially model interpretable (i.e., only some of its components are model interpretable). Furthermore, a machine learning system or suitable alternative embodiment, may be locally interpretable if all its output is output interpretable.

A grey-box, which is a hybrid mix of a black-box with white-box characteristics, may have characteristics of a white-box when it comes to the output, but that of a black-box when it comes to its internal behavior or functioning. Thus, in an exemplary the inner workings of the model may be unknown while the output may be interpretable.

A white-box may be a fully model interpretable and output interpretable system which can achieve both local and global explainability. Thus, a fully white-box system may be completely explainable and fully interpretable in terms of both internal function and output. An XNN is an example of an output interpretable and a fully model interpretable system.

A black-box may be output interpretable but not model interpretable, and may achieve limited local explainability, making it the least explainable with little to no explainability capabilities and minimal understanding in terms of internal function. A deep learning neural network may be an output interpretable yet model un-interpretable system.

A grey-box may be a partially model interpretable and output interpretable system and may be partially explainable in terms of internal function and interpretable in terms of output. Thus, an exemplary grey-box may be between a white-box and a black-box on a scale of most explainable and interpretable (white-box) to least explainable and interpretable (black-box). Grey-box systems may have a level of modular interpretability since some of their components may be model interpretable. An INN is an example of an output interpretable and partially model interpretable system.

Model interpretability may be a property of the embodiment implementation itself. Interpretable behavior may be used for controlling the final output result. For instance, in a simple linear regression model, the coefficients may be used for the resulting prediction output. In decision trees, the nodes may determine the decision boundaries, which may directly control the resulting output through the leaf nodes. An interpretable system or model may be capable of generating a model explanation accompanying the answer output, in a suitable format such as the one found in the generalized rule-based format or logical equivalent.

In an exemplary INN, the relevance estimators combined with the feature transformations may be used to compute the resulting output and, simultaneously, may be used to generate an explanation in a local manner.

Interpretable models may be global or local or offer a multi-level hierarchy. For instance, linear regression and decision trees may be globally explainable. INNs may achieve local explainability within one partition, however through the use of multiple partitions, global explainability may also be achieved. Additionally, INNs may be combined with black-box logic within the network itself. For example, INNs might function only as a locally-explainable model, since global explainability may only be possible when all the components of the model are fully-white-box. INNs adopt an XNN-like partition hierarchy system to achieve a multi-level hierarchy of interpretability.

For a globally interpretable system, each individual component may be understandable individually without having to undertake an analysis of the entire system as an indivisible whole. For example, an XNN, which may be a globally explainable system, may allow for conversion into several different formats while still retaining logical equivalence. A conversion might not be possible with models that are only capable of providing local interpretability.

Figure 5:
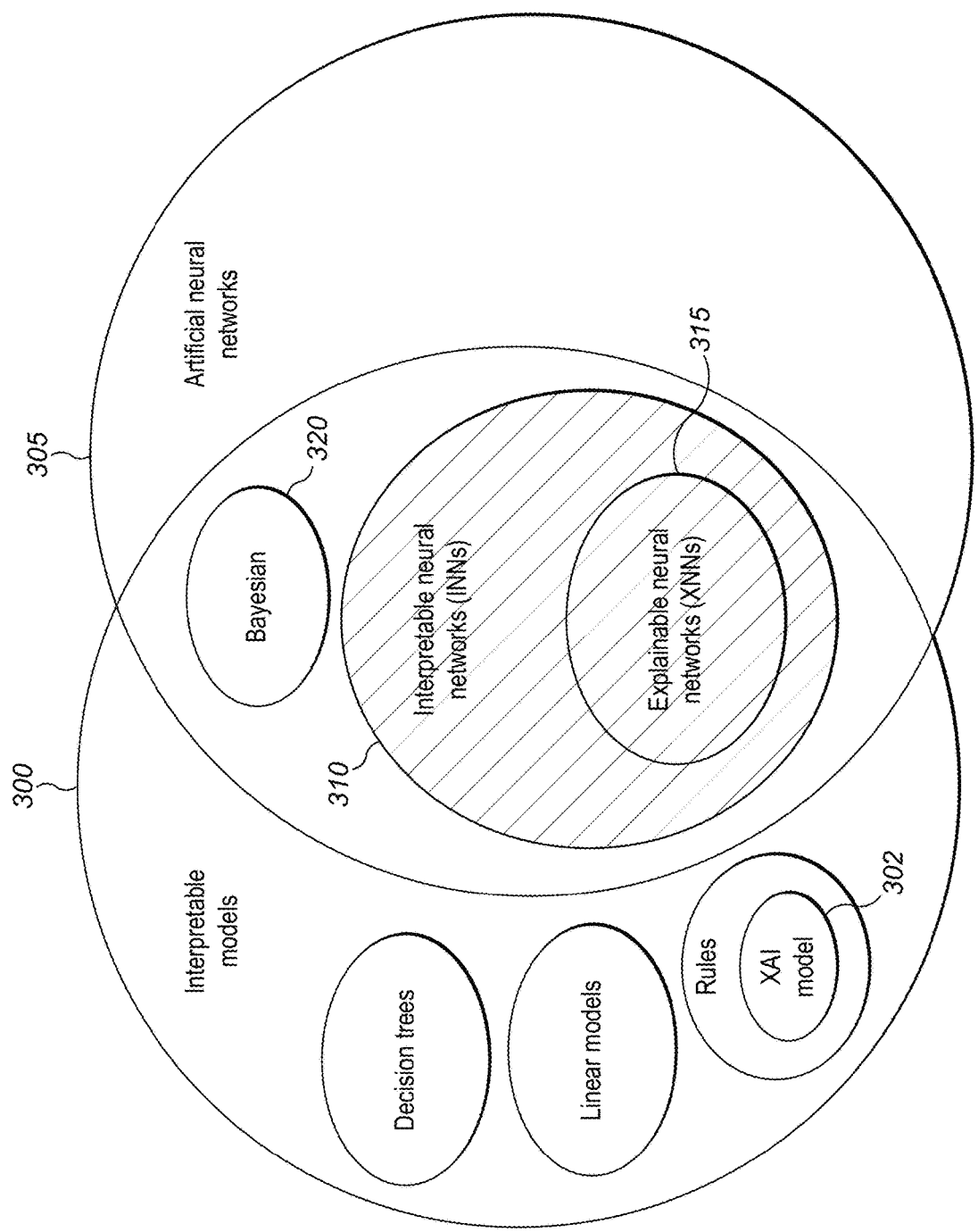
FIG. 5 is an exemplary Venn diagram illustrating expressive boundaries of exemplary interpretable models and neural networks.

Referring now to the exemplary embodiment in FIG. 5, FIG. 5 illustrates the expressive boundaries of exemplary interpretable models and artificial neural networks in general with various examples of exemplary machine learning implementations. The expressive boundary of interpretable models may be outlined by set 300. Interpretable models may include decision trees, linear regression, and rules. An XAI Model 302 may also be an interpretable model. The expressive boundaries of ANNs may be outlined by set 305. Various connectionist model implementations may be found within set 305, such as deep learning networks, Bayesian networks and the like. Some of the systems within set 305 may be black-box, while others may be interpretable, or logically equivalent to INNs. Alternatively, it may be possible to have an interpretable model, which is a connectionist model, a neural network, or an equivalent model, but not an INN, as shown in set 320. Finally, an INN may be either a fully white-box model, which may be logically equivalent to fully explainable models such as XNNs, as shown in set 315, or may be a gray-box model by providing local explainability as shown in set 310. Predictive INNs can be partially gray-box models with part of the model being implemented as a black-box. XTTs and Predictive XNNs can be white-box models but can also be implemented partially as a gray-box. XNNs may be a fully contained subset of INNs, while INNs themselves are a fully contained subset of ANNs. An Explainable Memory Network (XMN) may fall within set 315 if implemented as a fully white-box model, or in set 310 if implemented as a grey-box model. XSNs fall within set 302, as they are not ANN yet still fully interpretable and explainable.

Figure 18:
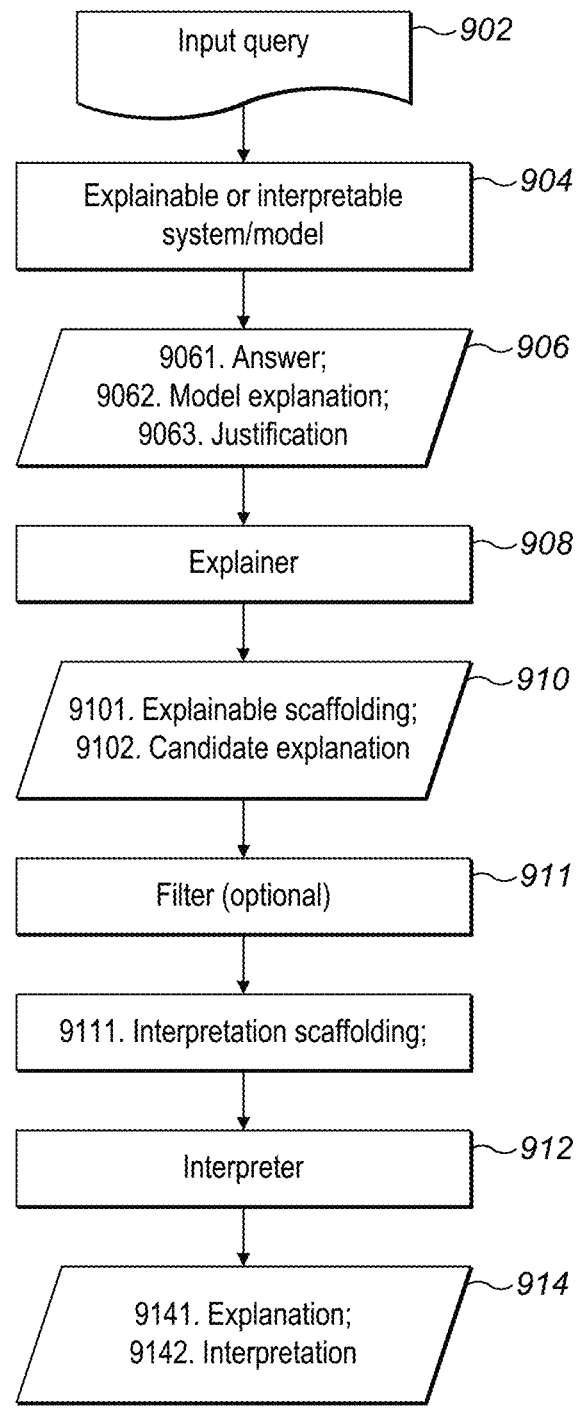
FIG. 18 is an exemplary embodiment of an explanation process with outputs.

Referring now to the exemplary embodiment in FIG. 18, FIG. 18 may present an exemplary explanation generation pipeline. The pipeline may begin with an input query 902, representing a data sample, scenario or other question which is currently being examined, which may then be processed through three components: the Explainable or Interpretable System/Model 904, the Explainer 908, and the Interpreter 912. Each of the three main components may produce different outputs which may be input to the next component in the pipeline. It may be contemplated that the Input Query 902 is not limited to a specific data sample or scenario only, and may relate to the entire model (global model explainability) or a modular explanation which deals with a specific component of the interpretable model.

The Explainable or Interpretable System/Model 904 may produce an Answer 9061, together with an optional Model Explanation 9062 of that Answer, and optionally a Justification 9063 of the Answer and/or its Model Explanation. The Justification 9063 of the Answer and/or its Model Explanation is an explanation of the model explanation (i.e., a meta-explanation) that gives additional information about the assumptions, processes and decisions taken by the Explainable or Interpretable System/Model 904 when outputting such Answer and/or Model Explanation. The Explainer 908 may produce an Explanation Scaffolding 9101, together with an optional Candidate Explanation 9102. Typically, the Candidate Explanation is generated as a result of processing of the Explanation Scaffolding 9101 and can be used in the process of evaluation of the contents of the Explanation Scaffolding in some form of iterative process involving unsupervised or supervised learning and optimization. The Filter 911 is an optional component that primarily transforms and filters the Explanation Scaffolding 9101 and the Interpretation Scaffolding 9111, typically after the Explainer 908 has produced output for the current step but before the Interpreter 912 starts.

The Interpreter 912 may produce an Explanation 9141, together with an optional Interpretation 9142 of that Explanation, using an Interpretation Scaffolding 9111.

The end result 914 of the explanation process, including either an Explanation and/or an Interpretation, may be provided to either a human user, another application, or another system component forming part of a larger embodiment, or some other automated system.

Note that FIG. 18 may be one exemplary pipeline and pipelines may be implemented in various alternative manners that may omit or combine one or more components, and/or execute them in different orders and sequences. For example, in an exemplary practical implementation embodiment, it may be contemplated that both the explainer 908 and interpreter 912 may be omitted together with their respective outputs 908 and 914.

In another exemplary embodiment, components 908 and 912 may be combined as a single component that produces a combination of the outputs 908 and 914.

In another envisaged embodiment, a simplified implementation of the Interpreter 914 simply takes the Candidate Explanation 9102 and outputs it as the Explanation 9141.

It may be further contemplated that in the case of a global (i.e., model level) explanation or a query-less application embodiment, even the input query 902 may be omitted without losing the logical equivalence to the exemplary pipeline in FIG. 18.

It may be contemplated that some combination of outputs in FIG. 18 may be combined together or omitted altogether in a practical embodiment. For example, it is envisaged that the Justification 9063 may be deemed optional in some applications, while the Interpretation 9142 may be left for a human interpreter or expert to create instead of an automated system. An interpretable machine learning system may be thoroughly understood and have its functionality and internal behavior (model interpretability), answers (output interpretability) and explanations interpreted and understood by an interpreter. The final explanations accompanying the answers might not require further post-hoc processing on their core structure, although additional cycles of processing to add syntactic and semantic information and to contextualize and personalize the explanation is acceptable, as illustrated in FIG. 18, where the explanation 9141 goes through different stages of transformation and enhancement before it gets to a final stage.

Linear methods, such as linear regression, may predict a target as a weighted sum of input feature variables. The linearity of the learned relationship may facilitate interpretation. Linear regression models have long been used by statisticians, computer scientists and others who tackle quantitative problems. Linear models may be used to model the dependence of a regression target y on some features x. The following is the equation of an exemplary linear model:

$$f(x) = \beta_0 + \sum_{i=1}^{m} \beta_i x_i$$

Where X is a vector with m dimensions and $\beta_i$ represents the coefficient, or relevance of the ith input feature.

In logistic regression, the target variable may be a discrete value, which is why it is used for classification. The interpretation of the weights in logistic regression may differ from the interpretation of the weights in linear regression, since the outcome in logistic regression is a probability between 0 and 1, and the weights do not influence the probability linearly any longer beyond 1. The weighted sum may be transformed by the logistic function to a probability.

Complex and non-linear models may model the coefficient βi as a function of the input X, such that $\beta_i = \theta(x)_i$. The function θ(x) may be a deep neural network which models some complex function. From an explainability point of view, whereas a linear model with static coefficients can provide global explainability, an embodiment may provide local explainability since the coefficients represent the relevance around a given input sample, identified by X. It may be contemplated that for a given explanation to be reliable, the calculated coefficients must remain stable for similar values of X. The non-linear model may be generalized as follows:

$$f(x) = \theta(x)_0 + \sum_{i=1}^{m} \theta(x)_i x_i$$

In an alternative embodiment, non-linear data may also be modelled using IF-THEN rules and combined with linear models. The ruleset may be defined as a list of rules with a number of conditions. Each rule may have its own relevance estimator identified by $\theta_j(x)$, where j represents the $j^{th}$ rule. The model may be generalized as follows:

$$f(x) = \begin{cases} \theta_1(x)_0 + \sum_{i=1}^{m} \theta_1(x)_i x_i, & C_1(x) == \text{True} \\ \ldots \\ \theta_j(x)_0 + \sum_{i=1}^{m} \theta_j(x)_i x_i, & C_j(x) == \text{True} \\ \ldots \\ \theta_k(x)_i x + \sum_{i=1}^{m} \theta_k(x)_i x_i, & C_k(x) == \text{True} \end{cases}$$

Additionally, the input vector X may be transformed through some non-linear function, such as polynomial transformation, Fourier transform or even a deep neural network which is capable of converting some input to higher abstract features. It is further contemplated, that the XNN transform function may be a pipeline of transformations, including but not limited to polynomial expansions, rotations, dimensional and dimensionless scaling, Fourier transforms, Walsh functions, state-space and phase-space transforms, Haar and non-Haar wavelets, generalized $L_2$ functions, fractal-based transforms, Hadamard transforms, Type 1 and Type 2 fuzzy logic, knowledge graph networks, categorical encoding, topological transforms of Kolmogorov/Frechet/Hausdorff/Tychonoff spaces, difference analysis and normalization/standardization of data. The transform function pipeline may further contain transforms that analyze sequences of data that are ordered according to the value of one or more variables, including temporally ordered data sequences (time series data). In mathematical notation, let T(x) represent some transformation function such that X→T(X). The linear function may be generalized, where z=|T(x)|, representing the number of transformed or derived features.

$$f(x) = \theta(x)_0 + \sum_{i=1}^{z} \theta(x)_i T(x)_i$$

By combing the foregoing transformation method with a rule-based method, an exemplary explainable model may be generalized further. It may be noted that the conditional function $C_j$ may be applied directly on the input vector X or on the transformed input by T(X).

$$f(x) = \begin{cases} \theta_1(x)_0 + \sum_{i=1}^{m} \theta_1(x)_i T(x)_i, & C_1(T(x)) == \text{True} \\ \ldots \\ \theta_j(x)_0 + \sum_{i=1}^{m} \theta_j(x)_i T(x)_i, & C_j(T(x)) == \text{True} \\ \ldots \\ \theta_k(x)_i x + \sum_{i=1}^{m} \theta_k(x)_i T(x)_i, & C_k(T(x)) == \text{True} \end{cases}$$

Additionally, when one of the transformed features in T(x) is equal to 1, the model may be simplified as follows:

$$f(x) = \begin{cases} \sum_{i=1}^{m} \theta_1(x)_i T(x)_i, & C_1(T(x)) == \text{True} \\ \ldots \\ \sum_{i=1}^{m} \theta_j(x)_i T(x)_i, & C_j(T(x)) == \text{True} \\ \ldots \\ \sum_{i=1}^{m} \theta_k(x)_i T(x)_i, & C_k(T(x)) == \text{True} \end{cases}$$

Finally, the aggregation function A may be generalized such that it may handle regression, binary classification, multi-class classification, etc. In an exemplary embodiment, the aggregation function may be a simple summation or logistic function in the case of classification. In mathematical terms, let A represent the aggregation function. The model may be generalized as follows:

$$f(x) = \begin{cases} A_1(\theta_1(x)T(x)), & C_1(x) == \text{True} \\ \ldots \\ A_j(\theta_j(x)T(x)), & C_j(x) == \text{True} \\ \ldots \\ A_k(\theta_k(x)T(x)), & C_k(x) == \text{True} \end{cases}$$

It may be contemplated that the model may have overlapping partitions. In this case, a ranking function may be applied to resolve the overlapping partitions. The ranking function may either activate one partition, or merge/aggregate the results from multiple partitions. Let R define the rank function, which brings the generalized model:

$$f(x) = R((P_1, P_2, \ldots, P_j, \ldots P_k))$$

Where $P_j$ is the $j^{th}$ partition output:

$$P_j = A_j(\theta_j(x)T(x)) \text{ if } C_j(x) == \text{True else } 0$$

Figure 4:
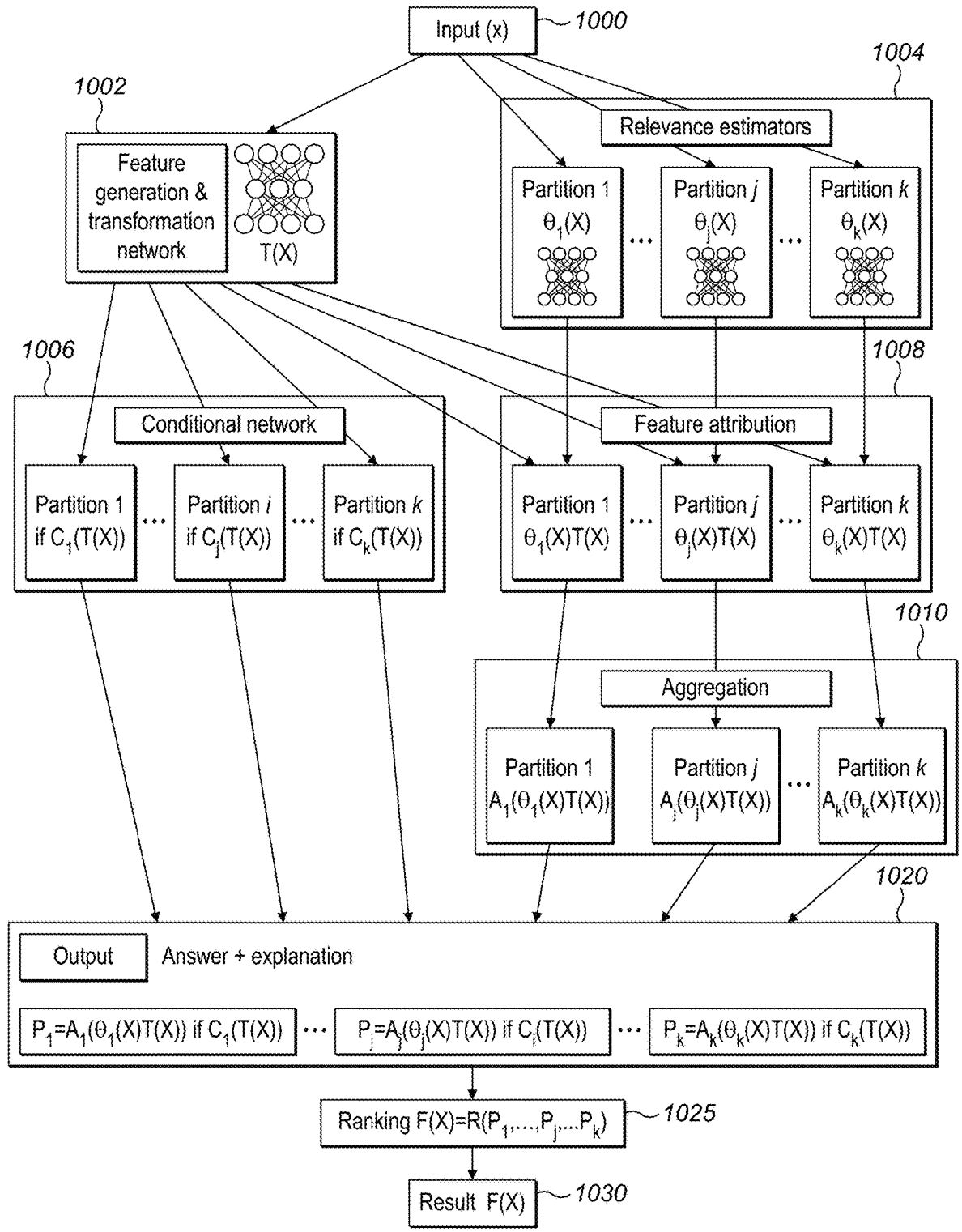
FIG. 4 is an exemplary architecture for an interpretable neural network.

Referring now to FIG. 4, FIG. 4 may illustrate an exemplary architecture for an interpretable neural network. An exemplary embodiment may apply architectural constraints to standard neural networks in order to model data. An exemplary embodiment may start with some input vector X 1000. The input may connect to a feature generation and transformation network 1002 and to k relevance estimators 1004. The transformed features may be abstract or high-level features which could have been computed using a deep neural network such as a CNN, a non-linear mathematical function such as polynomial expansion, Fourier transforms, continuous data bucketization, causal operators, or some other form of generated features, which may be discrete or continuous. The relevance estimator 1004 may calculate the coefficient, at least in a local manner, of each transformed feature.

In mathematical terms, the transformation network may be denoted as a function T(X). Similarly, $\theta_j(X)$ represents the relevance function of the $j^{th}$ partition. If X→T(X) returns a vector with z transformed dimensions, then X→$O_j(X)$ also returns a vector with z coefficients, or relevance weights. It may be assumed that $|T(X)| = |\theta_j(X)| = z$.

INNs may be flexible enough to allow modelling of complexity through various options and configurations. The functions X→T(X) and X→$\theta_i(X)$ may be a deep neural network which make it possible to model complex abstract features. The network may also be an XNN, in order to have a white-box estimator. It may be noted that the combination of T(X) and $\theta_i(X)$ may represent various embodiments of explainable models which are possible to implement with an INN architecture.

INN input may be provided using various devices including but not limited to display devices, sensory feedback devices such visual, auditory, or tactile feedback, haptic devices and any other output devices that are appropriate to the application domain. INN input may be received in any form including, but not limited to acoustic, speech, or tactile input, touch-sensitive devices, voice recognition devices, optical scanners, imaging devices, multi-dimensional scanners, LIDAR/RADAR/SONAR, time of flight measurement devices and other sensor devices.

The neural network may include a conditional network 1006. The conditional network 1006 may evaluate rules in the form of IF-conditions in order to activate one or more partitions. The output of Ci(X) may binary. It may be noted that the partitions may be static or dynamic and may be discovered either through an external partitioning process or through a connected neural network. It may also be noted that INNs may also function with only one partition, where for all values of X, $C_i(X)$ is always one. This is equivalent to having zero partitions. In this case, there is no need to apply a partitioning method to find suitable partitions.

The feature attribution 1008 may calculate the attribution of each transformed feature, which is activated by the associated partition. The relevance attribution may multiply the result of the computed coefficient with the transformed feature. In mathematical terms, feature attribution 1008 may compute $\theta_j(X)T(X)$ for the $j^{th}$ partition. The output of layer 1008 may serve as the basis of explanation generation. The values from this layer may be used to generate feature attribution graphs, heatmaps, textual explanations or other form of explanations.

In the aggregation layer 1010, the neural network aggregates the results for each partition (the predictive result for the activated partition). In mathematical terms, an exemplary aggregation function may be defined by $A_j(\theta_j(X)T(X))$. In an exemplary embodiment, the aggregation function may be a simple summation of the feature attributions. This becomes equivalent to a linear function, at least functioning in a local manner, such that the result $P_j = \theta_j(X)_1 T(X) + \ldots + O_j(X)_z T(X)$.

It may be contemplated that the model may have overlapping partitions. In this case, a ranking function may be applied to resolve the overlapping partitions. Let R define the rank function and $P_j$ the output of the $j^{th}$ partition, which brings the generalized model to:

$$f(x) = R((P_1, P_2, \ldots, P_j, \ldots P_k))$$

Finally, the switch layer 1020 may select the activated partition. If more than one partition is activated, some ranking function 1025 may need to be applied. The result may be generated through the result layer 1030.

In a practical embodiment, the INN model may have several optimizations in transformation functions T(x), in the estimators $\theta_j(x)$, in the aggregation function A, in the ranking function R or within some other component. INNs may provide a higher level of flexibility by enabling partitions to be customized according to the level of simplicity or complexity which is required.

Referring now to the exemplary embodiment in FIG. 5, FIG. 5 may illustrate the expressive boundaries of interpretable models and neural networks. Various embodiments with the INN architecture may be applicable. As shown in FIG. 5, INNs and XNNs may be both interpretable and explainable.

Figure 6:
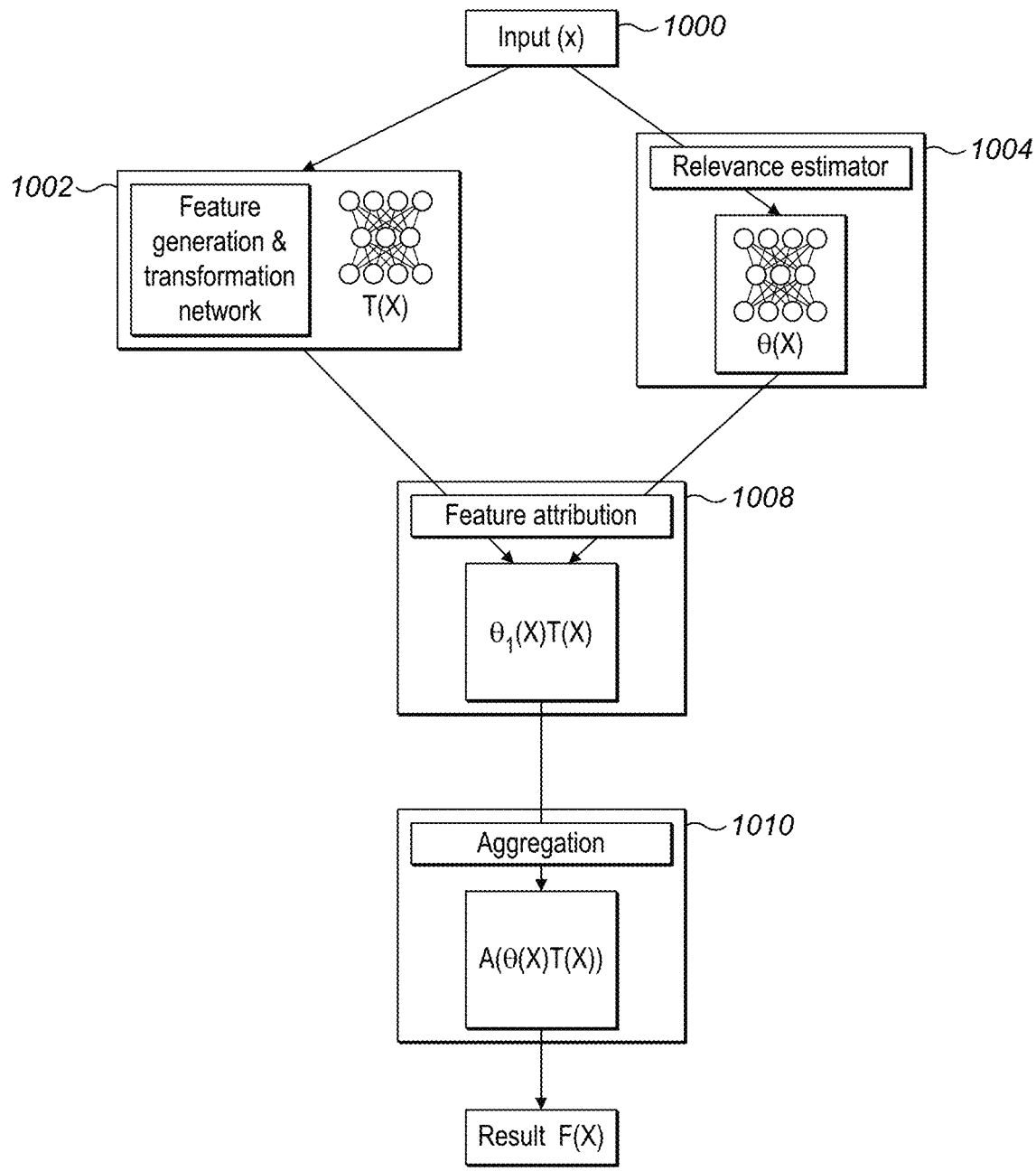
FIG. 6 is an exemplary schematic flowchart of an INN architecture with one partition.

An exemplary INN with 0 or 1 partitions may be capable of modelling non-linear data. To be able to model non-linear data, the transformer function T(x) and the relevance estimator θ(x) may be a deep-neural network. An exemplary high-level architecture of this variant is depicted in FIG. 6. The model may be simplified, such that there is no need of a conditional and switch layer. In mathematical terms, ƒ(x)=A(θ(x)T(x)).

INNs may incorporate partitions which are externally defined. Partitions may be obtained using a suitable partitioning method, such as the one found in the induction method. The partitions define the conditions for $C_1$ to $C_k$ where k denotes the number of partitions. The externally defined partitions may be hierarchical. In such a case, hierarchical partitions may be logically equivalent to a flat structure.

Partitions within an INN network may be overlapping or non-overlapping. When implementing overlapping partitions, a ranking layer may be needed in order to determine which partition to output. Alternatively, a weighted vector may also be used to apply a weighted output, similar to those found in ensemble models, where the results of multiple models, in this case multiple partitions, are fused into one result. In this exemplary case, the relevance estimators may also need to be aggregated in order to create the explanations covering the combined partitions.

Additionally, it may be contemplated that further variants of overlapping or non-overlapping partitions that have linearly separable Bayesian boundaries, non-linear boundaries, and other type of boundaries may also be created in an interpretable manner. For example, partitions may be defined using a system of Bezier curves for graphical applications and other suitable embodiments. The partition membership function depends on the choice of Partition function or functions and is a key choice in the resulting explainability of the induced model. The partition types and characteristics may also be determined by the choice of Partition function or functions. Suitable partition types include linear, Bayesian and curvilinear partitions, including continuous and non-continuous segmented partitions, such as Bezier curve segments, and other suitable partition types that lend themselves to explainability and interpretability. In topological terms, the model induction method may use the Partition function or functions to transform the predictor model computational data space from a T0 (Kolmogorov), T1 (Frechet), T2/T3/T4/T5/T6 (Hausdorff) and T3½ (Tychonoff) space into a T2/T3/T4/T5/T6 (Hausdorff) and T3½ (Tychonoff) space used by the induced white-box model.

The partitions within an INN network may be fixed or dynamic. With fixed partitions, the partitions may remain the same before, during and after training of the INN network. Static partitions may need to be determined prior to training of the INN. An embodiment with dynamic partitions may require an end-to-end neural network such that the loss function during back propagation minimizes the overlap within partitions and maximizes the accuracy of the resulting model. The number of partitions may also be taken into consideration. An exemplary INN may work both with static partitions, dynamic partitions, or without partitions at all. An exemplary INN may utilize externally defined partitions through some induction or partitioning method, or via an end-to-end system, where partitions are discovered during training of the INN network.

Figure 10:
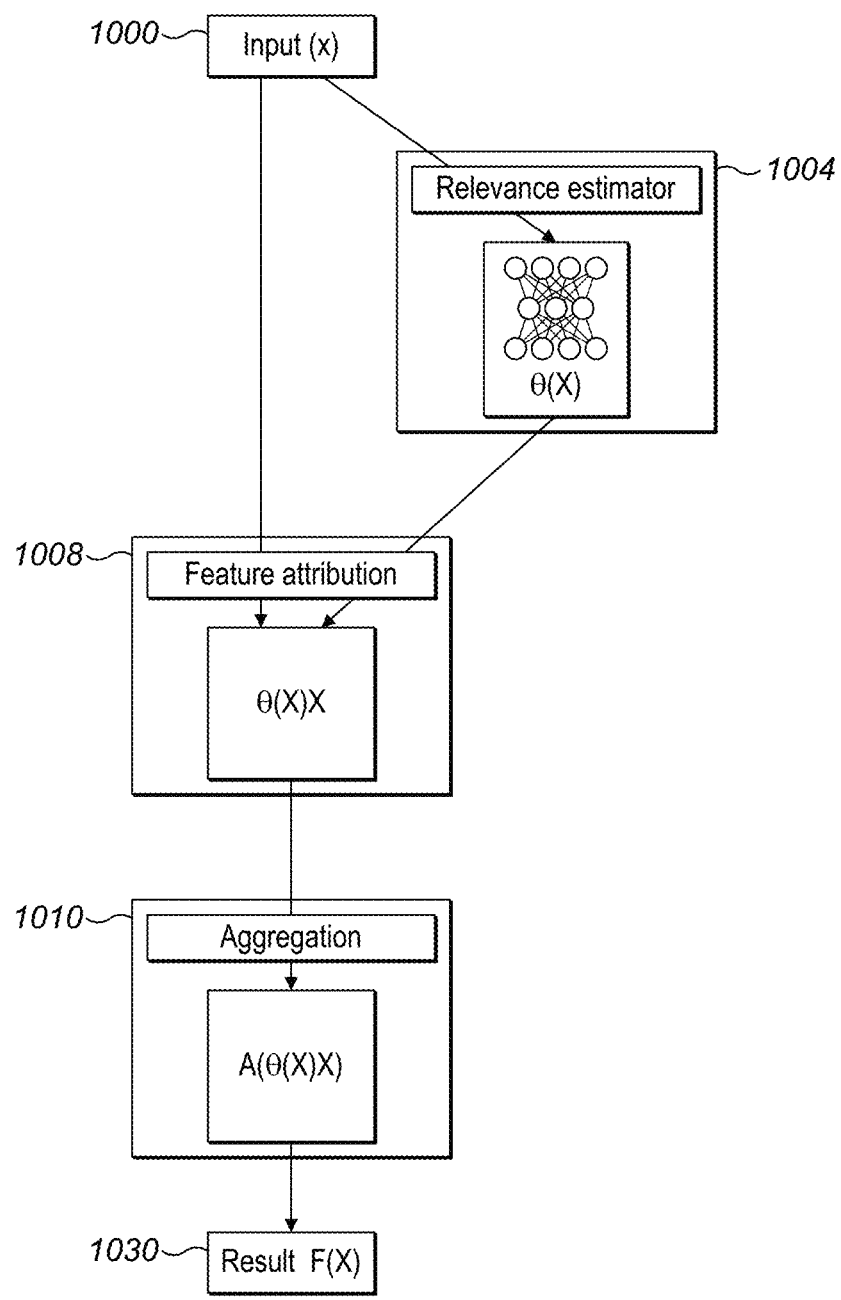
FIG. 10 is an exemplary schematic flowchart illustrating an INN architecture.

In an exemplary embodiment, the INN architecture may be modeled such that T(X)=X. This may be applicable when feature attributions with a direct link to the input need to be generated. Heatmaps are an example of explanations where the explanations are linked directly to the importance of each pixel, i.e., input feature. FIG. 10 shows an exemplary INN architecture without a transformer function and zero partitions.

In an exemplary embodiment, an INN may be monitored during its nominal operational cycle for anomalies, variances, and deviations from normal operational states and status. It is further contemplated that such a monitoring mechanism may be achieved by combining an INN with a Behavioral Model (BM), or similar control engineering solution, that allows the definition and implementation of conditions, event, triggers, and actions. Monitoring constraints and expressions underlying conditions, events, triggers and actions may be implemented in a variety of suitable exemplary implementations including, but not limited to, in the form of symbolic rules or system of symbolic expressions, polynomial expressions, conditional and non-conditional probability distributions, joint probability distributions, state-space and phase-space transforms, integer/real/complex/quaternion/octonion transforms, Fourier transforms, Walsh functions, Haar and non-Haar wavelets, generalized L2 functions, fractal-based transforms, Hadamard transforms, Type 1 and Type 2 fuzzy logic and difference analysis. Monitoring constraints and expressions may also be implemented in form of a data structure that references the different features and variables accessible to the explainable model and any associated taxonomies, ontologies, and causal models. Monitoring constraints and expressions may also be implemented in the form of knowledge graph networks, control charts, Nelson rules, Bode plots, Nyquist plots and related methods that determine whether some measured behavioral variable is out of control—i.e., giving a measure of unpredictability versus consistency.

Figure 12:
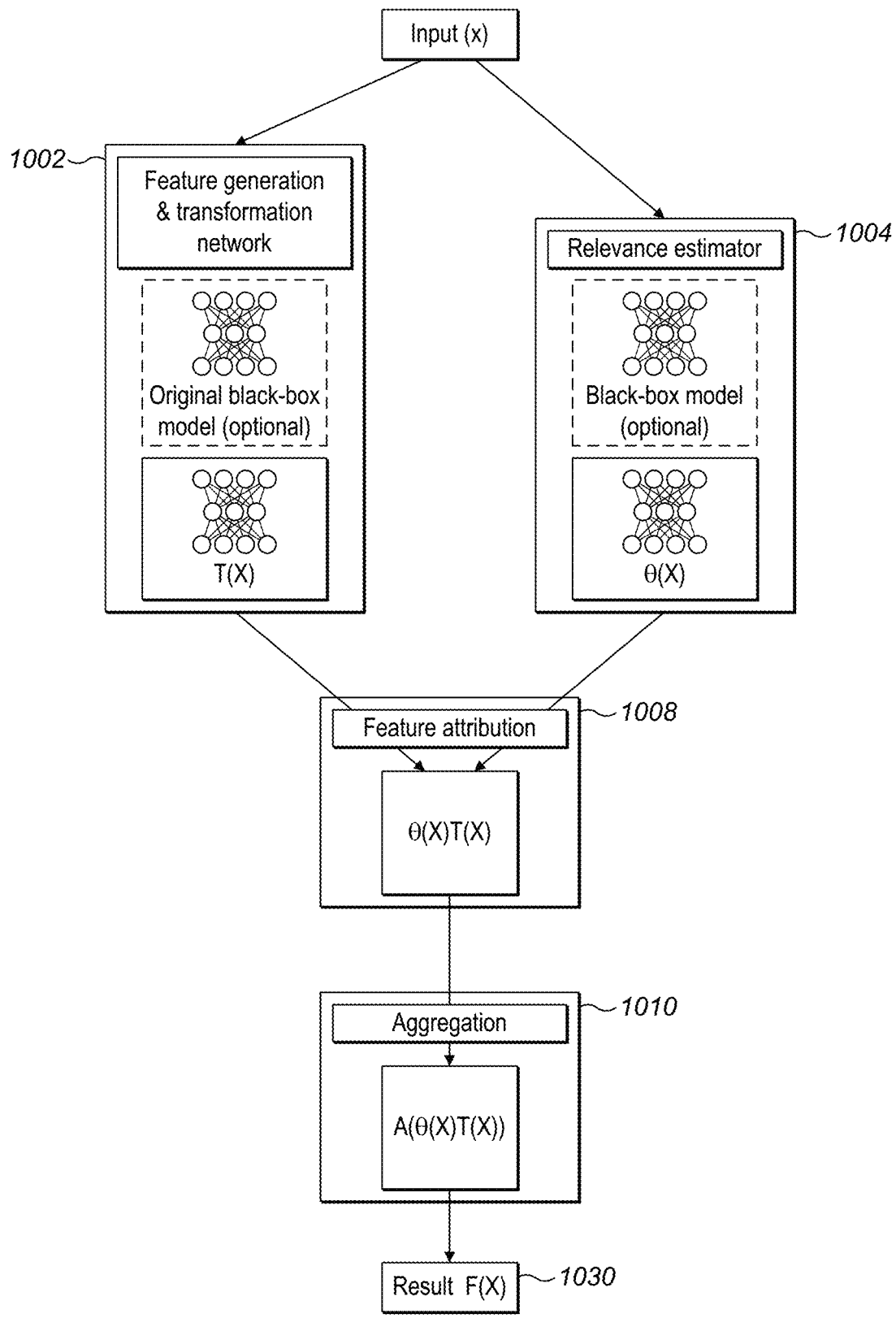
FIG. 12 is an exemplary schematic flowchart illustrating an INN initialized via transfer learning.

In an exemplary embodiment, an INN may be created from a black-box model which takes some input X, and converts it to some hidden or latent state, which is then used for generating the result. FIG. 12 shows how an exemplary black-box model may be used to initialize an INN architecture, forming part or all of the relevance estimator and/or transformer functions. When applying transfer learning, the final layer, or a number of layers from the end of the black-box model, may be excluded. The embedded network structure may include fixed or non-trainable weights to allow training to perform faster. It may also be noted that an exemplary embodiment may also include complex layers such as LSTM, Word Embeddings/Word2Vec, CNN layers, and so on. When applying transfer learning, the resulting INN may be a grey-box, i.e., some of its components may be model interpretable and it may have an interpretable output that may also be explainable. However, unlike XNNs, in an INN the original black-box predictor might not be disposable, and thus INNs may be suitable for local interpretability while global interpretability may be implemented towards specific modules or partitions. Local interpretability may be applied to a wide variety of applications including bias detection, explanation generation, and other applications.

INNs can take advantage of having access to the original black-box predictor so that whenever the original black-box predictor updates or changes, transfer learning can easily update the INN model. INN re-training in a full or incremental manner may be contemplated.

In another exemplary embodiment, the trained neural network may mimic the functionality of a black-box. In such case, perturbations on the black-box prediction may be done to up-sample or enhance the training data. The addition of the black-box or predictor model as input to the INN may help in reducing or eliminating errors and/or noise from the original input dataset.

In an exemplary embodiment, an INN may implement Fast Weights, known as Fast INNs (F-INNs). As may be understood in the art, Fast Weights may provide a temporary repository of certain previous events through weight variables which may change more quickly than standard model weights, essentially providing a "short-term memory" for the system. Fast Weights may give a superior boost to runtime performance of the resulting INN system while enabling it to adapt quickly to changing input dataset distribution and new previously unforeseen training data samples that were not part of the original training dataset. F-INNs may also be more efficient at handling sequence input data and other similar multi-dimensional input data.

In an exemplary embodiment, once the INN model is trained via transfer learning, further training epochs may be applied to the INN model directly without the need to use the back-box model on its own again. After the initial transfer learning, the embedded predictor model may be configured to have trainable weights which enables the original predictor to fuse into a new model which is now part of the INN. In another exemplary embodiment, other equivalent techniques to transfer learning, possibly involving the use of Genetic Algorithms, Monte Carlo Simulation Techniques, Bayesian networks and other methods may be used to train the INN model from a black-box model.

In an exemplary embodiment, the resulting INN model N may be a result of conversion of a black-box or other type of model U. Model N may be an approximate or perfect bisimulation of U, i.e., N~U. The degree of bisimulation between the INN and the original black-box model may be a parameter that can be set during the training process itself. In terms of model and output interpretability, bisimulation may refer to the output interpretability of an INN.

An XNN is a new type of Artificial Neural Network (ANN) that is inherently interpretable and explainable. An exemplary XNN may have a fully interpretable inner network structure and thus may be a fully white-box model. Interpretability is built within the architecture itself, which may still function like a standard neural network. This may eliminate the need to apply additional techniques or processing for interpreting the result of an exemplary neural network. XNNs may compute both the answer and its explanation in a single feed-forward step without any need for simulations, iterations, perturbation, etc. XNNs may also be easily implementable both in software and in hardware efficiently, leading to substantial speed and space improvements.

An exemplary XNN may be formed by combining multiple local models into one global model. Local models may analyze a small area within the entire search space. In an exemplary embodiment, when a transaction is analyzed in a local manner, a linear model may sufficiently explain the model. On the other hand, global models may illustrate the model with a holistic view. XNNs may merge the two—multiple partitions may represent the local zones and multiple linear models may explain each partition, which may be combined to form a global model. XNNs can create a partition hierarchy via splitting and merging of partitions, at different spatial and data scales and levels of detail. Partitions can be non-overlapping or overlapping. In the case of non-overlapping partitions, the XNN may take a single path in feed forward mode. In the case of overlapping partitions, the XNN may take multiple paths in feed forward mode and may compute a probability or ranking score for each path. In an alternative embodiment, overlapping partitions may also make use of an aggregation function which combines the results from the activated partitions. Additionally, XNNs may go beyond linear data. An XNN may cater to non-linear data by embedding transformations within the neural network itself, while still retaining explainability. Each layer, neuron, and connection within an XNN may have a precise, well known, and understandable function, unlike standard ANNs which are a black-box. XNNs are thus the first ever known fully white-box ANNs, giving rise to new category of neural networks that are understandable and interpretable.

Figure 7:
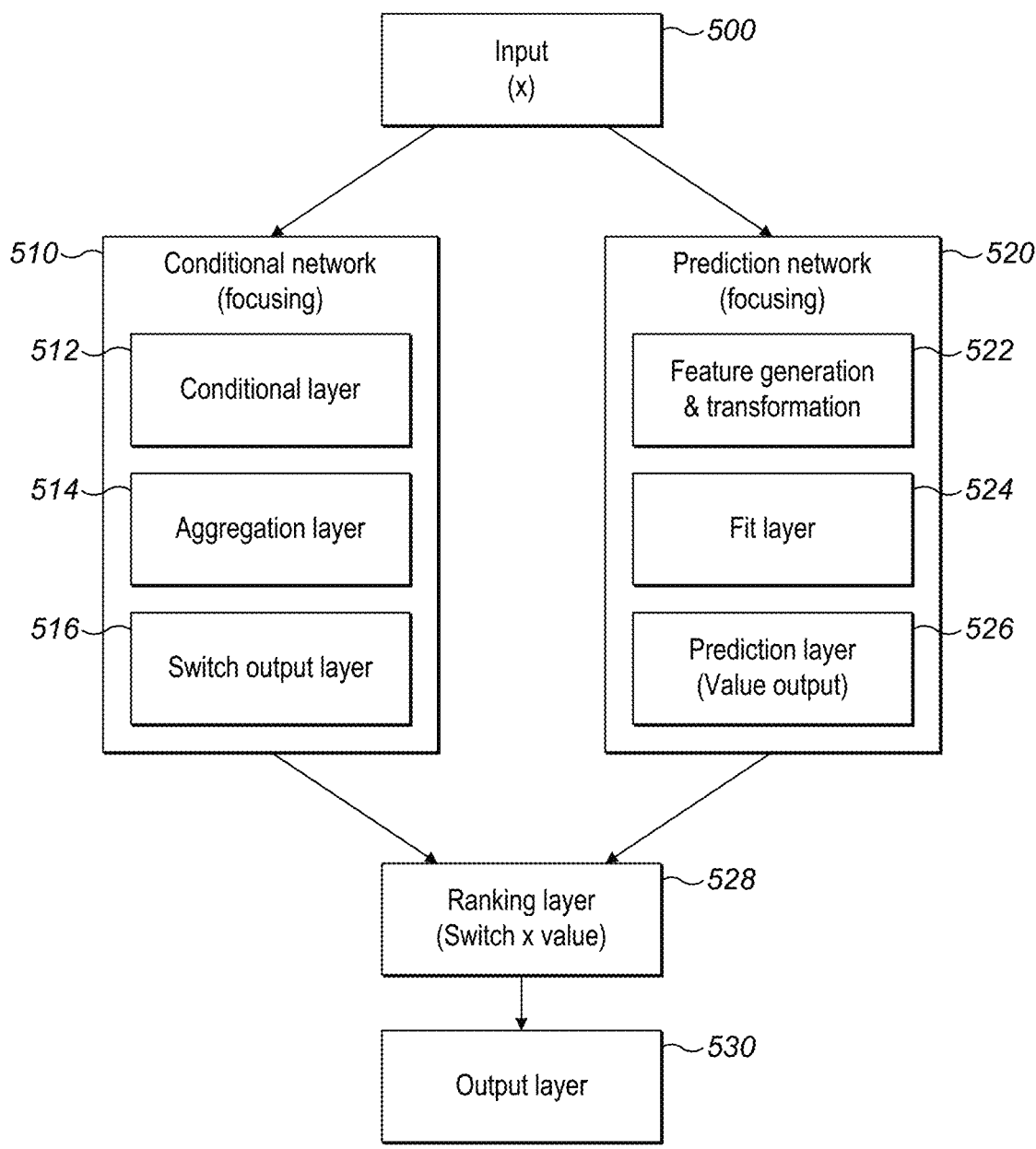
FIG. 7 is an exemplary schematic flowchart illustrating a high-level XNN architecture.

Referring now to FIG. 7, FIG. 7 may illustrate a schematic diagram of an exemplary high-level XNN architecture. An input layer 500 may be inputted, possibly simultaneously, into both a conditional network 510 and a prediction network 520. The conditional network 510 may include a conditional layer 512, an aggregation layer 514, and a switch output layer (which outputs the conditional values) 516. The prediction network 520 may include a feature generation and transformation 522, a fit layer 524, and a prediction output layer (value output) 526. The layers may be analyzed by the selection and ranking layer 528 that may multiply the switch output by the value output, producing a ranked or scored output 530. The explanations and answers may be concurrently calculated by the XNN by the conditional network and the prediction network. The selection and ranking layer 528 may ensure that the answers and explanations are correctly matched, ranked and scored appropriately before being sent to the output 530.

Figure 13:
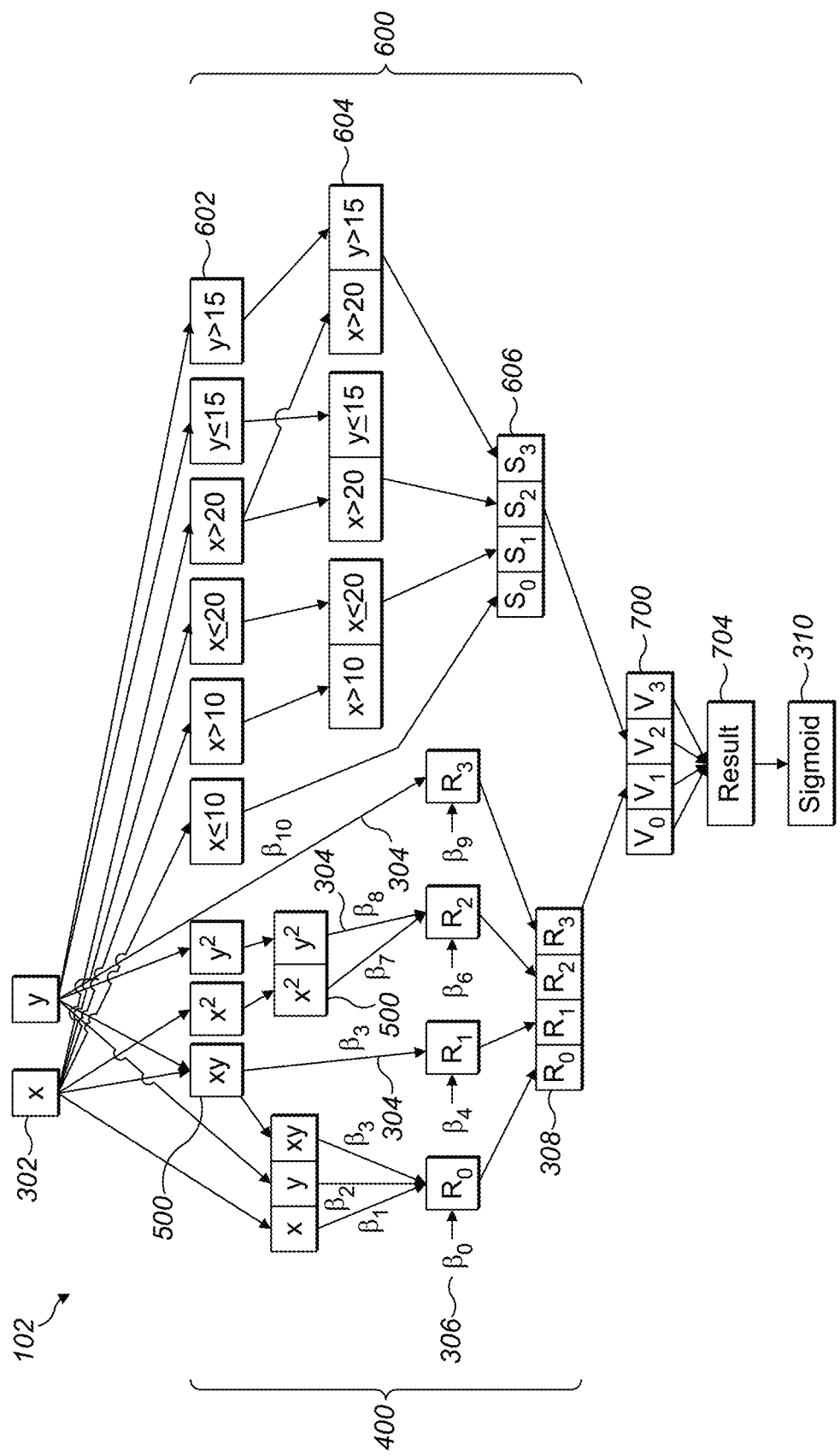
FIG. 13 is an exemplary schematic flowchart illustrating a sparse XNN architecture.

FIGS. 12 and 13 may illustrate an exemplary XNN architecture which combines the results from the switch output layer and the value output layer. The example depicted in FIGS. 12 and 13 are logically equivalent to the following exemplary ruleset:

$$f(x, y) = \begin{cases} \text{Sigmoid}\left(\begin{array}{l}\beta_{0,0} + \beta_{1,0}x + \beta_{2,0}y + \\ \beta_{3,0}x^2 + \beta_{4,0}y^2 + \beta_{5,0}xy\end{array}\right), & x \leq 10 \\ \text{Sigmoid}\left(\begin{array}{l}\beta_{0,1} + \beta_{1,1}x + \beta_{2,1}y + \\ \beta_{3,1}x^2 + \beta_{4,1}y^2 + \beta_{5,1}xy\end{array}\right), & x > 10 \wedge x \leq 20 \\ \text{Sigmoid}\left(\begin{array}{l}\beta_{0,2} + \beta_{1,2}x + \beta_{2,2}y + \\ \beta_{3,2}x^2 + \beta_{4,2}y^2 + \beta_{5,2}xy\end{array}\right), & x > 20 \wedge y \leq 15 \\ \text{Sigmoid}\left(\begin{array}{l}\beta_{0,3} + \beta_{1,3}x + \beta_{2,3}y + \\ \beta_{3,3}x^2 + \beta_{4,3}y^2 + \beta_{5,3}xy\end{array}\right), & x > 20 \wedge y > 15 \end{cases}$$

Figure 8:
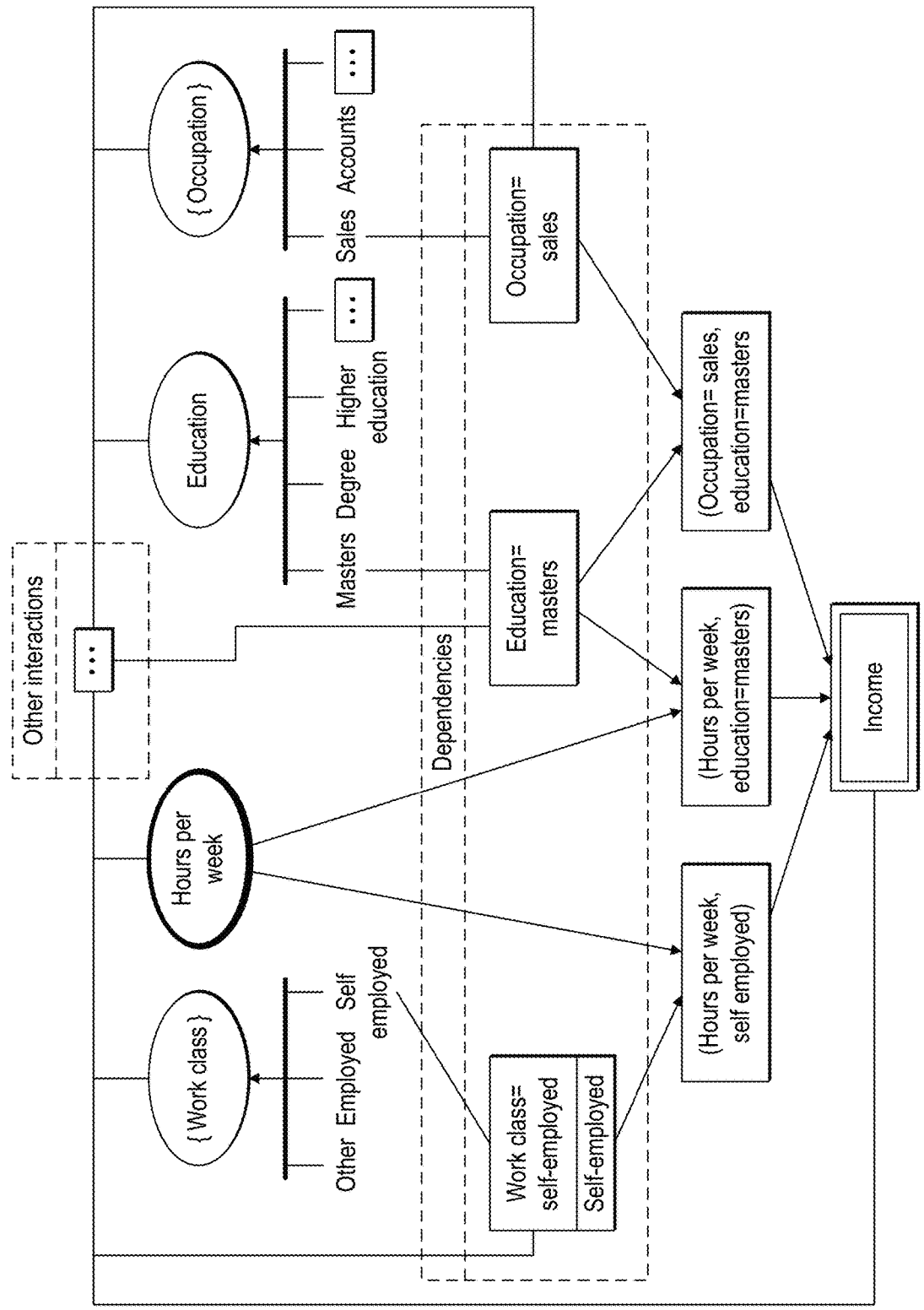
FIG. 8 is an exemplary Explanation Structure Model (ESM) illustrating a structured INN explanation output.

The ruleset may be found following the activation function 310. The exemplary architecture in FIG. 7 may begin with an input 500. The input may then be used as inputs to the conditional network 510 and the prediction network 520. As illustrated in FIG. 7, the prediction network may contain a feature generation and transformation layer 522, a fit layer 524, and a value output layer 526. The value output layer 526 may provide equations which correspond to rules which weigh different features of the inputs. Further, the input 500 may be used as input to the conditional network 510, as illustrated in FIGS. 7 and 8. Again, the conditional layer 512 and aggregation layer 514 may produce conjunctive rules or other logical equivalents or partitions which may be represented in the switch output layer 516.

The outputs of the value output layer 526 and the switch output layer 516 may be combined in the output layer 530. Once the output layer 530 has been formed, a sigmoid or other activation depending on the application.

XNNs may present an intuitive way to construct interpretable models, while still utilizing the power of ANNs and related methods such as deep learning. Once the model is trained through back-propagation or a similar method, the resulting neural network can be used to serve predictions and the inner structure of the XNN can be used to construct the rules.

Figure 9:
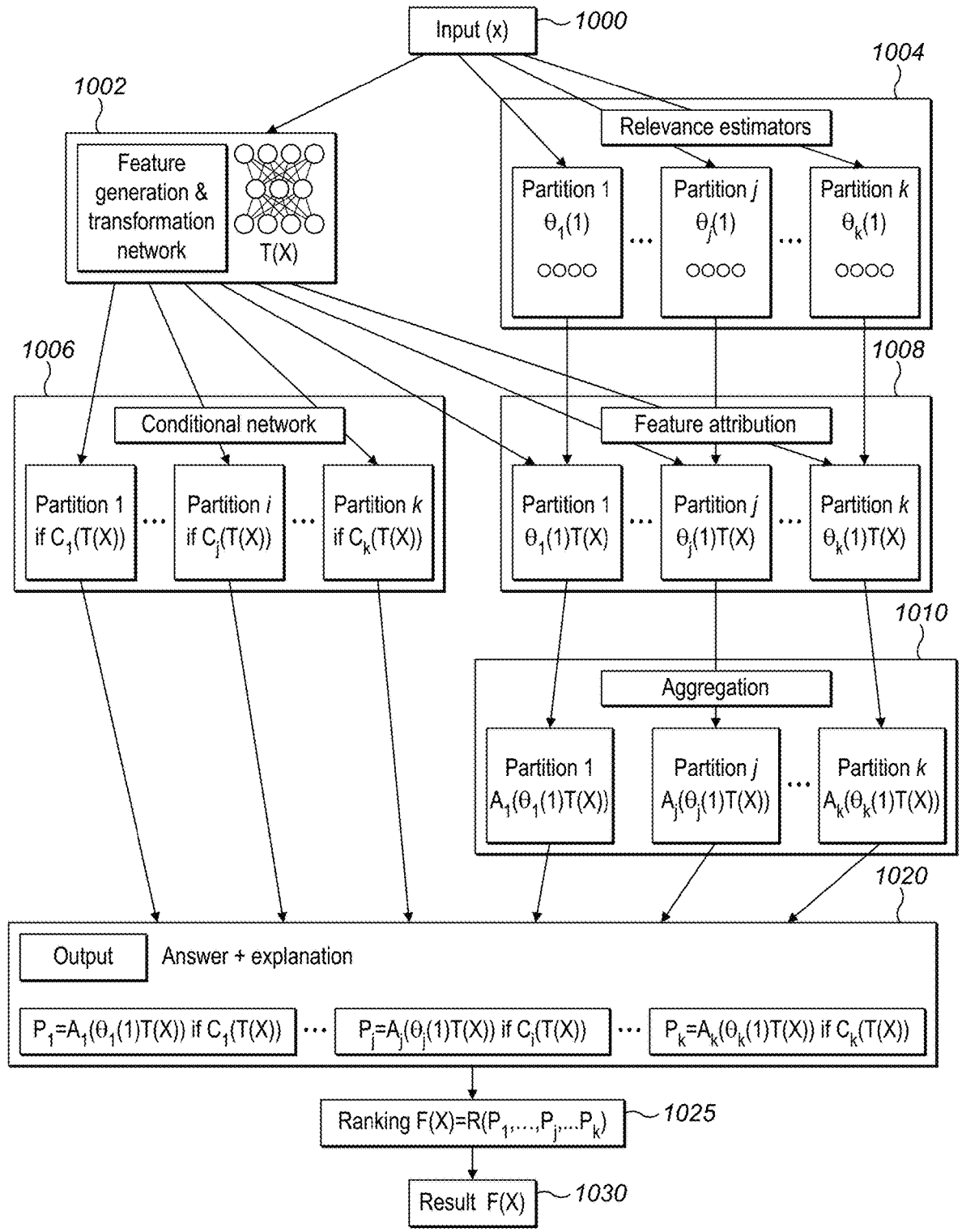
FIG. 9 is an exemplary schematic flowchart illustrating XNNs in an INN architecture.

FIG. 9 may illustrate how an exemplary INN may create a logically equivalent network to the XNN. The input 1000 values of X may be a constant, such as value of 1. The transformer function T(X) 1002 may be the same as the transformation layer 500 in FIG. 13.

The relevance estimator functions 1004 may be designed such that the input is always taken from a constant value, such as a constant value of one. This may allow the learnt estimator to act like the fit layer 524. The learnt weights may correspond to the coefficients of the rule-based model.

The feature attribution layer 1008, followed by the aggregation layer 1010 may be logically equivalent to the fit layer 524 and prediction/output layer 526. The switch layer 1020 may be equivalent to the switch 528 found in the XNN. Any activation functions, such as those used with an XNN, may be part of the aggregation function 1020. The result 1030 may be equivalent to the result 530.

In an exemplary embodiment, an INN model N that is the result of conversion of an XNN model X. N may be an approximate or perfect bisimulation of X, i.e., N~X. The degree of bisimulation between the INN and the XNN is a parameter that can be set during the training process itself.

In an exemplary embodiment, if the logically equivalent INN does not use any black-box structures, the resulting INN may be an XNN itself. If the logically equivalent INN uses any black-box structures, the resulting INN may be a grey-box INN.

The conversion from XNN to INN may be made in a manner that does not require the INN to use any black-box structures (i.e., the INN qualifies itself as a white-box XNN). The reverse conversion from INN to XNN may result in a white-box XNN. The bisimulation property between the INN and XNN may be preserved, in either case of a resulting grey-box INN or a white-box INN (i.e., another XNN). In terms of model and output interpretability, bisimulation may refer to output interpretability.

In another exemplary embodiment, INNs may utilize XNNs in one or more of the relevance estimators 1004. An XNN may be embedded to act as an explainable relevance estimator in an exemplary network 1004. The estimator may have its own induction process. The embedded XNN may be used for estimating the value of $\theta_j$. It may be contemplated that the k estimators may not necessarily include an XNN. An INN may contain a mix of black-box and white-box relevance estimators. In other words, INNs may mix white-box and black-box partitions, that is, some partitions are model interpretable if they have an associated white-box estimator, whereas other partitions are only output interpretable if they have an associated black-box estimator. The number of model interpretable components determine the level of model interpretability on the entire model. The level of model interpretability may be estimated via the degree of coverage of the model's input-output space by white-box and black-box estimators forming part of the grey-box INN.

Figure 17:
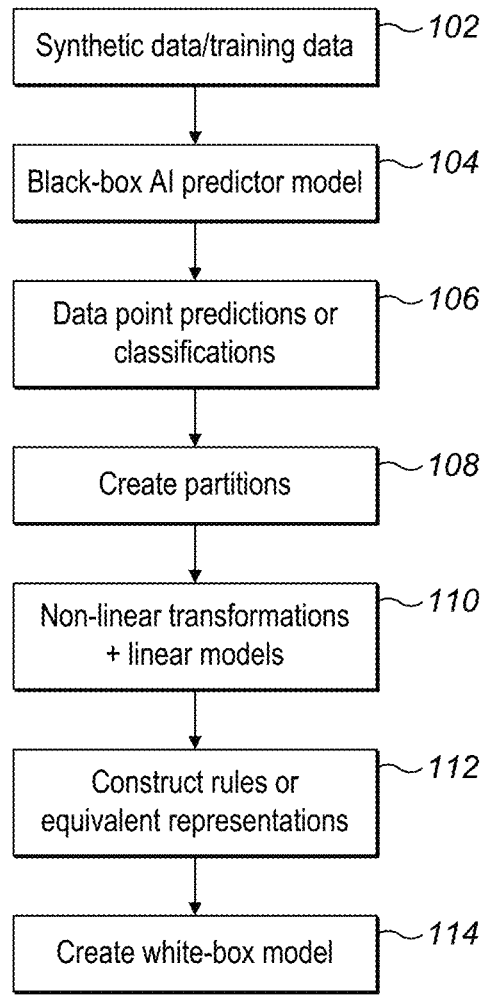
FIG. 17 is an exemplary model induction process.

It is further contemplated that such components may correspond to partitions and/or their associated relevance estimator Referring now to FIG. 17, FIG. 17 may illustrate an exemplary model induction method. An induction method may be used to convert a black-box estimator to a white-box estimator. It may be noted that this exemplary embodiment only illustrates one possible conversion process. Other methods may implement end-to-end deep learning, reinforcement learning or genetic algorithms and the like for the conversion process. It may be contemplated that for example, with reference to FIG. 9, end-to-end deep learning may be used to learn the structure of the Relevance Estimators 1004, Feature Attribution 1008, and Aggregation 1010 and may combine them into one single end-to-end component with a suitably formulated loss function.

FIG. 17 may illustrate an exemplary method for extracting an explainable white-box model of a machine learning algorithm from a black-box machine learning algorithm. In an exemplary first step, synthetic data may be created or obtained 102. Perturbated variations of the set of synthetic data may also be created so that a larger dataset may be obtained without increasing the need for additional synthetic data, thus saving resources. The synthetic data may then be loaded into the black box system as an input 104. The black box system may be a machine learning algorithm of any underlying architecture. In the case of INNs, the model may include a deep neural network representing one particular relevance estimator. The black box system may additionally contain non-linear modelled data. The underlying architecture and structure of the black box model may not be important since it may not be analyzed directly. Instead, the synthetic data may be loaded as input 104, and the output can be recorded as data point predictions or classifications 106. Since a large amount of broad synthetic data was loaded as input, the output data point predictions or classifications may provide a global view of the black box algorithm.

Still referring to exemplary FIG. 17, the method may continue by aggregating the data point predictions or classifications into hierarchical partitions. 108. Rule conditions may be obtained from the hierarchical partitions. The process to find the partitions is, or the boundary of the partition, is an external function defined by Partition(X). Partition(X) may be a function configured to partition similar data and may be used to create rules. The partitioning function may include a clustering algorithm such as k-means, entropy, or a mutual information (MI) based method.

The hierarchical partitions may organize the output data points in a variety of ways. In an exemplary embodiment, the data points may be aggregated such that each partition represents a rule or a set of rules. The hierarchical partitions may also be subject to one or more iterative optimization steps that may optionally involve merging and splitting of the hierarchical partitions using some suitable aggregation, splitting, or optimization method. A suitable optimization method may seek to find all paths connected topological spaces within the computational data space of the predictor while giving an optimal gauge fixing that minimizes the overall number of partitions. The hierarchical partitions may then be modeled using mathematical transformations and linear models. Although any transformation may be used, an exemplary embodiment may apply a polynomial expansion.

Further, a linear fit model may be applied to the partitions 110. Additional functions and transformations may be applied prior to the linear fit depending on the application of the black box model, such as the SoftMax or sigmoid function. The calculated linear models obtained from the partitions may be used to construct rules or some other logically equivalent representation 112. The rules may be stored in any medium. For example, the rules may be stored as mathematical equations or may be represented using first order symbolic logic. It is further contemplated that rules may utilize a combination of abductive, inductive, deductive logic in conjunction with causal logic. Using inductive logic, explainable models, XNNs and INNs may generate predictions based on generalized rules and knowledge that may have been learnt fully automatically. Using deductive logic, explainable models, XNNs and INNs may generate predictions according to a combination of one or more conditions or constraints. Using abductive logic, explainable models, XNNs and INNs may retrofit an observed scenario to a known set of possible states in the explainable model, XNN or INN, or be able to explain the currently observed input (which in turn, could have been the output of a previous step or input-output cycle) in a justifiable manner. Abductive logic can also be useful in practical implementations of diagnostic systems and can be used to aid in the diagnosis and troubleshooting of AI systems.

Storing the rules as such may allow the extracted model to be applied to any known programming language, including symbolic programming languages, and may be applied to any computational device. Finally, the rules may be applied to the white box model 114. The white box model may store the rules of the black box model, allowing it to mimic the function of the black box model while simultaneously providing explanations that the black box model may not have provided. Further, the extracted white-box model may parallel the original black box model in performance, efficiency, and accuracy. The final white-box model may then be converted to an XNN in order to build an explainable relevance estimator 1004. It is further contemplated that the extracted model and the rules may be applied to a hardware specification and may subsequently be used to output a hardware device and/or hardware circuit specification in a suitable output format such as the VHSIC Hardware Description Language (VHDL), Verilog, AHDL or other suitable hardware specification language.

INNs may be used to embody other explainable and interpretable architectures including, but not limited to, eXplainable artificial intelligence (XAI) models, eXplainable Neural Nets (XNN), eXplainable Transducer Transformer (XTT), eXplainable Spiking Nets (XSN), eXplainable Memory Nets (XMN), eXplainable Reinforcement Learning (XRL) and any other suitable implementations.

Although some examples may reference one or more of these specifically (for example, only XAI or XNN), it may be contemplated that any of the embodiments described herein may be applied to XAIs, XNNs, XTTs, XSNs, XMNs, or XRLs interchangeably.

An exemplary embodiment may be implemented entirely in hardware using either: (i.) flexible architectures like FPGAs, or (ii.) more static architectures like ASICs, analogue/digital electronics, discrete components, photo-electronic components or (iii.) spintronics and neuromorphic architectures, spiking neuromorphic architectures that are suited for the hardware implementation of connectionist models such as XNNs, or (iv.) quantum computing hardware, or (v.) some other suitable hardware solution.

In an exemplary embodiment, INNs may be implemented using discrete components, which may be useful for small size INNs. The advantages and disadvantages of such an implementation are similar for ASIC and related implementations. Cost and robustness considerations may make this type of implementation attractive, for example, when high power systems are involved or when a simple INN is needed for basic control or safety monitoring.

In another exemplary embodiment, INNs may be implemented using neuromorphic hardware. Interpretable models such as INNs, enable such architectures to be made understandable by presenting a model that can mostly be further presented to people in the form of rules and/or workflows. This surface representation form can be edited and then seamlessly reconverted back into the neural, connectionist format that is needed for neuromorphic hardware. Such an exemplary embodiment provides a practical solution for editing, adding, and deleting relevant information and consequently changing the behavior of neuromorphic devices in a controlled, reliable, and replicable manner.

In another exemplary embodiment, INNs may be implemented using spintronics. Spintronics intertwine memory and computing components leading to a potentially more efficient hardware implementation since there does not need to be much, if any, transfer of memory values, weights, etc. during operation. Spintronic INN implementations may have similar characteristics to an FPGA implementation if they are reprogrammable. Non-reprogrammable spintronics may have similar characteristics to ASICs. INNs can be efficiently implemented using spintronics by converting all the different layers and neurons in the INN to a spintronic circuit. Spintronic implementations of predictive INNs and related predictive variants may be particularly efficient in practice due to the conflation of memory and processing that is available in a spintronic circuit. Faster data access and the elimination or reduction of having computationally expensive data transfer requests over a data bus can significantly improve the performance of INNs and all their variants. In case of predictive INN varieties, the amount of input data, being a stream or series rather than just a single snapshot, may be magnitudes higher and thus the performance gains are multiplied and amplified. It is further contemplated that hybrid implementations may be needed due to the presence of black-box components in the INN.

In another exemplary embodiment, INNs may be implemented on neuromorphic hardware. Neuromorphic hardware also intertwines memory and processing in a similar manner to spintronics. Hardware neuromorphic INN implementations may be highly efficient while having most of the advantages and flexibility similar to that of a general computing architecture without actually needing a general computing architecture.

In another exemplary embodiment, INNs may be implemented on neuromorphic hardware that employ spiking neurons rather than the more common activation function-based neurons. Spiking neurons within an INN implementation may increase the power efficiency and processing throughput very significantly, making some practical applications feasible that would otherwise be unfeasible with non-spiking neurons.

In an exemplary embodiment, INNs may be implemented on quantum computing hardware. It is contemplated that an INN implemented on a quantum processing system will have rules that are similar to classical explainable models with the addition of quantum specific extensions. For example, such an extension may allow for the specification of quantum annealing effects and their correct interpretation. In another example, a quantum-specific extension may allow for the correct interpretation of multiple qubit states, qubit basis states, mixed states, Ancilla bits, and other relevant quantum effects due to entanglement and/or decoherence. In another example, a quantum-specific extension may allow for the introduction of quantum logic specific operators and/or hardware logic gates within an XNN, such as quantum controlled-not (CNOT), controlled-swap (C SWAP), Ising gates (XX, YY, ZZ gates), Pauli gates, Hadamard gates, Toffoli gates and other relevant quantum logic operations that may be combined serially or in parallel.

Quantization and other compression techniques may be applied on the INN for faster and more efficient execution.

In an exemplary embodiment, INNs may be used to recognize hand-written digits. In one example, the INN architecture may include a number of partitions which focus on a specific cluster of digits. A transformer function T(X) may be defined to map the input to higher level features. This may be used when an explanation using higher abstract features (rather than pixels) needs to be generated. In an alternative embodiment, the system may also need to generate explanations mapped directly on the raw input, such as when generating a heatmap.

Figure 11:
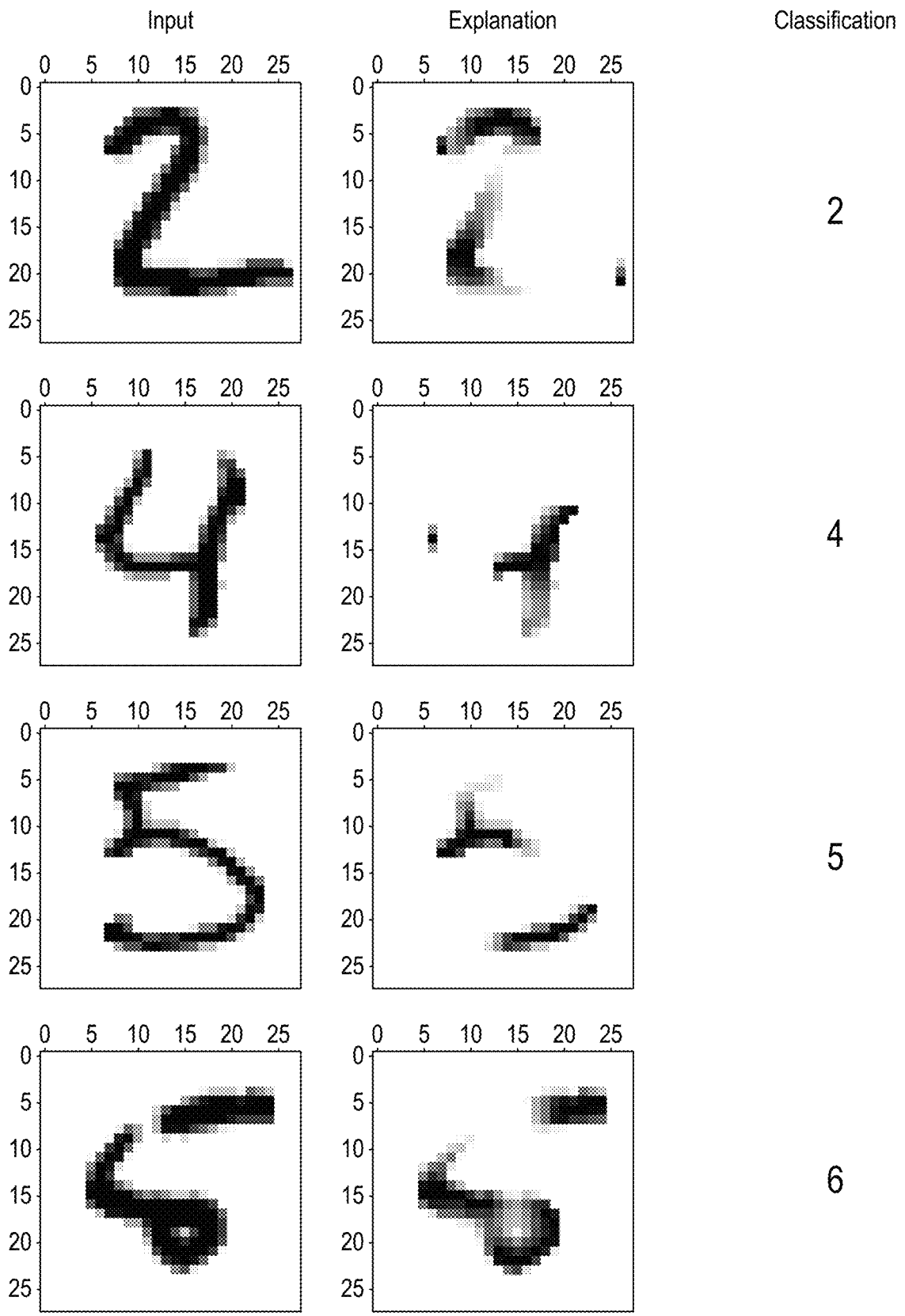
FIG. 11 is an exemplary embodiment of an output from an exemplary embodiment.

To build an interpretable network, a number of layers may need to be created in order to model non-linear relationships. Several CNN layers may be created in order to construct the relevance estimators which map X→θ(x). In an exemplary embodiment, a relevance estimator may include an encoder CNN which converts the input X to some latent space, followed by a decoder which converts the latent space to some relevance parameters. In the example shown in FIG. 11, the feature attribution determines the importance of each pixel for the predicted output.

In an exemplary embodiment, a model may be used to detect abnormal patterns of data packets within a telecoms network. The model may be configured to take appropriate action, such as allowing a user to remain connected, discarding some of the data packets, or modifying the routing priority of the network to enable a faster or slower transmission. For all of these scenarios, an explanation of why the selected action is required may be generated with a white-box model. A black-box model would simply recommend the action without any explanation. It may be useful for both the telecoms operator and the customer to understand why the model came to such a conclusion. A white-box model can provide an understanding as to which conditions and features lead to the result. In an exemplary INN, explanations may be identified by the feature attribution layer, after computing the relevance estimation θ(x) together with the transformed features T(x).

Both parties may have different goals. From one side, the telecoms operator is interested in minimizing security risk and maximizing network utilization, whereas the customer is interested in uptime and reliability. In one case, a customer may be disconnected on the basis that the current data access pattern is suspicious, and the customer has to close off or remove the application generating such suspicious data patterns before being allowed to reconnect. This explanation helps the customer understand how to rectify their setup to comply for the telecom operator service and helps the telecom operator from losing the customer outright, while still minimizing the risk. The telecom operator may also benefit from this explanation. The operator may observe that the customer was rejected because of repeated breaches caused by a specific application, which may indicate that there is a high likelihood that the customer may represent an unacceptable security risk within the current parameters of the security policy applied. Further, a third party may also benefit from the explanation: the creator of the telecom security model. The creator of the model may observe that the model is biased such that it over-prioritizes the fast reconnect count variable over other, more important variables, and may alter the model to account for the bias.

Figure 19:
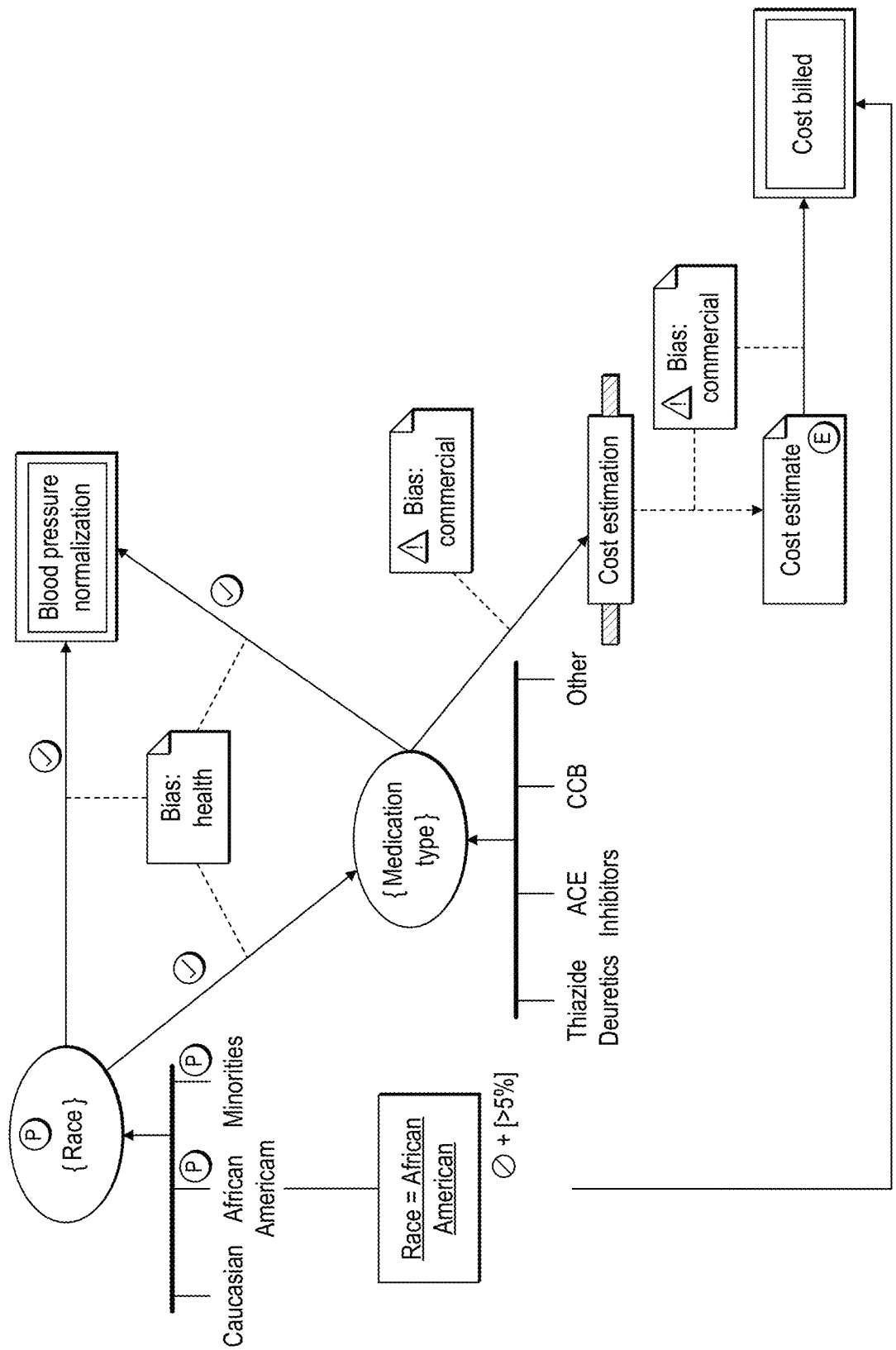
FIG. 19 is an exemplary Explanation Structure Model (ESM) illustrating an example of acceptable and unacceptable bias.

INNs can also be used for bias detection, assessment, and mitigation in the input data and/or the resulting model. The global nature of INNs can also be used to detect areas of strength and weakness in the underlying data training set. The partition hierarchy in an INN can allow for segmented and targeted handling of different parts of the model, including precise handling of protected classes, nodes, and edges. INNs can thus allow interactive and directed feedback from the AI system to humans in the collection of future training data by identifying gaps and weaknesses that need to be addressed. INNs can also allow precise identification and assessment of bias, optionally within an Identify-Assess-Recommend-Resolve (IAR) framework. FIG. 19 shows a typical Explanation Structure Model (ESM) used in an exemplary medical application implementation of an INN. The exemplary INN initially outputs the ESM shown in FIG. 19, depicting the decisions taken to recommend medication to patients to achieve acceptable blood pressure readings, while simultaneously working out the cost to be billed to the patient or their health insurance service. Application users may use the exemplary ESM to mark the type of bias shown in the causal diagram depicted by the ESM, which in this case involves racial bias. In this example, medication decisions based on racial characteristics for health reasons are acceptable, thus allowing the INN to use race as a deciding factor in recommending the optimal medication for the patient. However, the application user has marked that for the cost calculation part of the INN, any increase in cost due to racial characteristics that increases the cost by more than 5% of the average cost is unacceptable. In the exemplary FIG. 19, the sources of unacceptable bias have been identified and acceptance tolerances clearly marked. In a first exemplary solution, an INN may then be either modified structurally by a model bias mitigation process that eliminates or mitigates the unacceptable paths from the input to the output. In a second exemplary solution, an INNs results may be modified via an appropriate external workflow, Data Lake, RPA, or other controlling system to reduce or mitigate the effect of the known bias. In a third exemplary solution, a mediator component is introduced within the INN to counter the effect of the known bias, for example, by granting affected patient classes refund vouchers that reduce the medication costs back to within the acceptable tolerance range of average cost+5%.

Explanation may be provided at different levels of abstraction. The abstraction level may be determined by the transformation function T(x). At a base level, the factors may include the number of connections in the last hour, bandwidth consumed for both upload and download, connection speed, connect and re-connect count, access point information, access point statistics, operating system information, device information, location information, number of concurrent applications, application usage information, access patterns in the last day, week or month, billing information, and so forth. At a higher abstract level, features may also be summarized through the function T(x), for example, bandwidth >1 TB, re-connect count >20, together with a combination of multiple conditions. The features at different level of abstraction, may each weigh differently, according to the telecom network model, through the relevance estimator θ(x).

Additionally, the telecom operator may decide to inject human-knowledge, or blend knowledge from another system. For this reason, several partitions may be created, which may allow the model to have segmented and localized explanations. For instance, a partition may be created for each telecom zone, or through some more complex partitioning, which may also require an external partitioning system.

The explanation may be presented or transformed into various types of machine and human readable explanations, such as text, images, or diagrams. Machine generated explanations may be fed into other systems, such as those found in reinforcement learning (RL).

Since INNs/XNNs may be encoded into rules and may make use of an external process to initialize the structure of the INN partitions, it may be possible to embed human-knowledge within the neural network. Human knowledge may be embedded in an XNN model through the necessary transfer learning/conversions which may be applicable depending on the compatibility of the human knowledge. The compatibility of the human knowledge may be determined according to a universal representation format. Essentially, any human knowledge that can be represented in a compatible format can be supported by the INN. The rule representation format may be a system of Disjunctive Normal Form (DNF) rules or other logical alternatives, like Conjunctive Normal Form (CNF) rules, first-order logic assertions, and the like. In an alternative embodiment, other non-Boolean logical systems may be utilized such as Type 1 or Type 2 fuzzy logic systems, modal logic, quantum logic, probabilistic logic, or other suitable type of logical system for the expression of logical or similar statements.

INNs may also have neuro-symbolic constraints that may be implemented in a variety of suitable exemplary implementations including, but not limited to, in the form of symbolic rules or system of symbolic expressions, polynomial expressions, conditional and non-conditional probability distributions, joint probability distributions, state-space and phase-space transforms, integer/real/complex/quaternion/octonion transforms, Fourier transforms, Walsh functions, Haar and non-Haar wavelets, generalized L2 functions, fractal-based transforms, Hadamard transforms, Type 1 and Type 2 fuzzy logic and difference analysis. Neuro-symbolic constraints may also be implemented in form of a data structure that references the different features and variables accessible to the explainable model and any associated taxonomies, ontologies, and causal models. Neuro-symbolic constraints may also be implemented in the form of knowledge graph networks.

In an exemplary embodiment, an INN may link its neuro-symbolic conditions with its previous historic rate of activations in order to constrain the rate of trigger activation or operational cycle speed. It is further contemplated that the fusion of such neuro-symbolic conditions may be based on multiple models, such as a causal model, an explainable model x, where x∈{XAI, XNN,XTT,XRL,XSN,XMN, INN} or logically equivalent or similar architectures.

Human knowledge can improve INNs by refining the rule-based knowledge bases in the INN via gradient descent techniques. In an exemplary embodiment, special configurations may be applied to lock specific neurons or layers, thereby preventing the network or system from updating those neurons or layers. The human knowledge can be fixed, while still allowing the machine-generated rules to be updated in a global manner. Thus, humans may assert control and embed rules, desired behavior, and potential safety features within the resulting machine-generated system, safe in the knowledge that these directives will not be changed over time by the AI system. The process of injecting knowledge from humans to the AI systems may be referred to as Human Knowledge Injection (HKI). When directives are incorporated into the AI system, a sub-set of the weights and functions representing these directives may be marked as static information when implemented in software or as static hardcoded circuit when implemented in hardware. Such a configuration still allows for the rest of the AI system to be trainable and refinable using standard machine learning methods such as gradient descent methods or back-propagation but guarantees that the original directives will be left unchanged over a potentially large number of training iterations and automatic modifications. This static and unchanging guarantee provides peace of mind to human designers who may want to ensure that a particular directive, especially one related to safety, desired behavior, ethical concern, or some other related desired property cannot be overridden or modified by the AI system during its normal operation or during training or related modes of operation. Of particular interest is a static hardware implementation which may be even more robust to change tampering.

A number of nodes and edges, and other events, triggers, constraints, and actions in an INN may be deemed to be important or critical for the particular application domain. Such importance may be determined either by the application or usage context, or via an external third party, such as a regulatory or legal authority or an industry standard making body, that imposes certain mandatory constraints. These type of important or critical constraints may be referred to as anchor terms, anchor variables, anchor nodes, anchor edges, anchor events, anchor triggers, anchor constraints and anchor actions, respectively. Such anchor components may be analogous to the anchor terms within Explanation Structure Models (ESMs).

In an exemplary embodiment, INNs may be incorporated within a suitable risk identification, assessment, and mitigation framework, such as that proposed by the ISO27001 model. It is also contemplated that INNs may be incorporated within an Identify-Assess-Recommend-Resolve (IAR) framework that utilizes different metrics to identify issues, then related metrics to assess the severity of the identified issue, followed by ranked and/or scored recommendations and finally coupled with a decision to execute such recommendation as part of a resolution plan. It is further contemplated that such an INN may further incorporate a Goal-Plan-Action (GPA) system with the IAR framework.

It may be contemplated that INNs may perform conversions and transformations to the inner functions of the neural network. Transformations allow optimizations to be done at a modular level when the INN is partially interpretable, alternatively, transformations may be done in a global manner when the model is fully interpretable, i.e., white-box. Since the interpretable components may be comprehended on their own, transformations may be done in a partial manner. For instance, a partition with a local linear or non-linear function may be transformed into a logically equivalent function. A partition may be further sub-divided into other partitions which are logically equivalent. Alternatively, partitions may also be merged or split, or a function may be compressed to a simpler format, such as the dense/sparse formats used in XNNs. Transformations also allow scale, rotation, and/or translational invariance to be applied to specific components of the INN network.

INNs may apply intelligent merging and summarization of partitions at multiple levels of detail, while also catering to scale and rotational and translational invariances whenever possible. Adjacent partitions in multi-dimensional space that have a possible fit in multi-dimensional space which summarize one or more partitions more efficiently may get an associated summary that may be more amenable to explanation generation.

Scale invariance may be accounted for by appropriate relevance estimators or coefficients which adjust the scale in multiple dimensions. Rotational invariance may be accounted for by having appropriate rotational weights that adjust rotation in multiple dimensions. This is a powerful feature of INNs that enables non-linear data to be explained in a superior manner than methods that simply use linear methods exclusively. For example, if multiple partitions representing a rotated elliptical boundary exist in the INN model, these partitions can be merged into a single representation of a rotated ellipse, giving a precise yet highly summarized representation of potentially complex boundaries that may be voluminous to describe using linear fitting. The resulting summary explanation is also more accurate than could be achieved using linear fitting and also follows the widely accepted principle that a shorter explanation is preferred over a longer explanation whenever available.

When the INN model is fully interpretable, which makes it equivalent to an XNN, transformations to the neural network may be applied such that the neurons and nodes are stored in a sparse or dense format. The exemplary XNN architecture in FIG. 13 is logically equivalent to the following system of equations:

$$f(x, y) = \begin{cases} \text{Sigmoid}(\beta_0 + \beta_1 x + \beta_2 y + \beta_3 xy), & x \leq 10 \\ \text{Sigmoid}(\beta_4 + \beta_5 xy), & x > 10 \land x \leq 20 \\ \text{Sigmoid}(\beta_6 + \beta_7 x^2 + \beta_8 y^2), & x > 20 \land y \leq 15 \\ \text{Sigmoid}(\beta_9 + \beta_{10} y), & x > 20 \land y > 15 \end{cases}$$

In an exemplary dense XNN, every neuron in one layer may be fully connected to each neuron in the proceeding layer.

Figure 14:
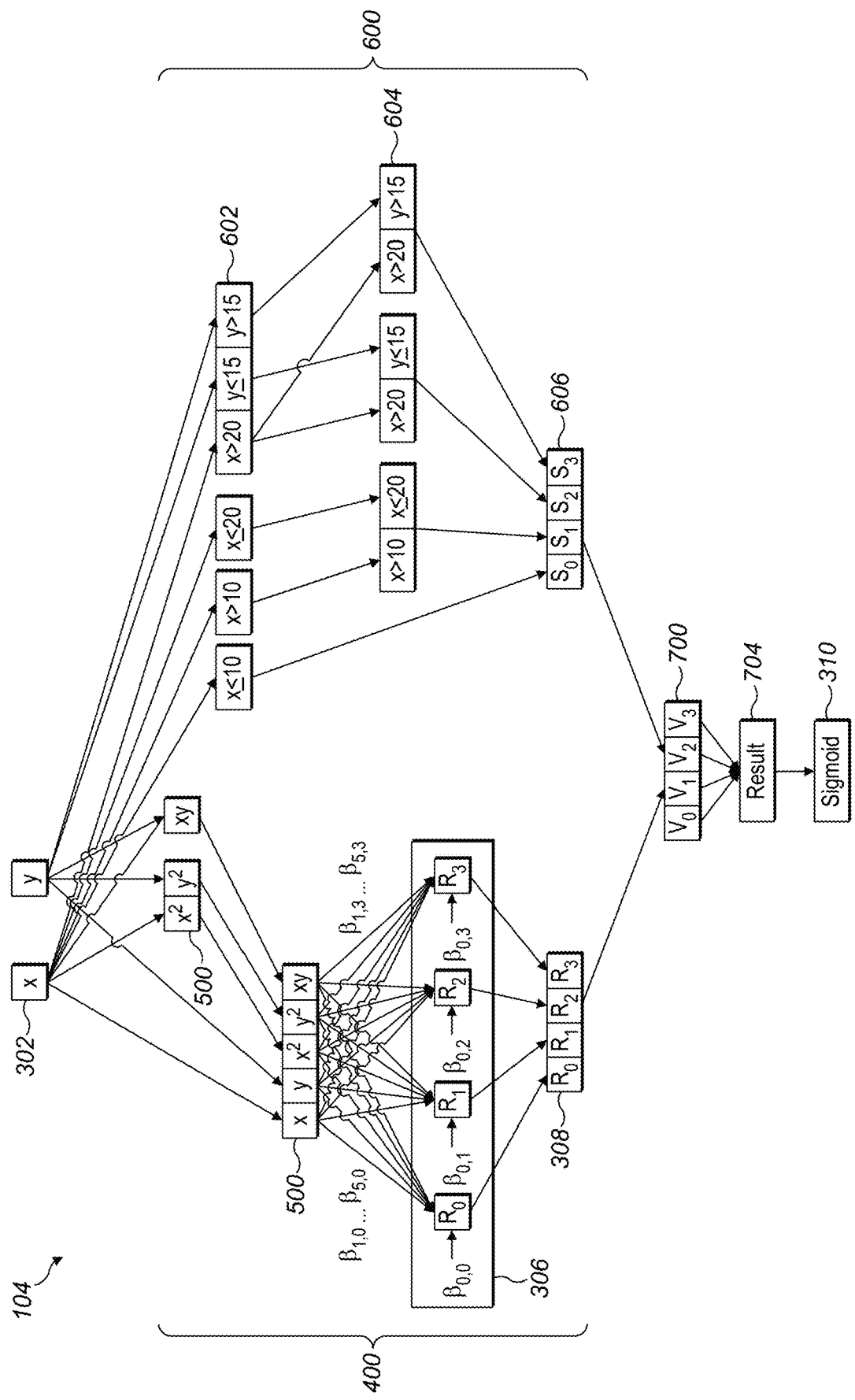
FIG. 14 is an exemplary schematic flowchart illustrating a dense XNN architecture.

Referring now to exemplary FIG. 14, FIG. 14 may illustrate an exemplary dense XNN architecture. The dense XNN may include the same components as the sparse XNN, such as a prediction network 400 and a conditional network 600. However, the prediction network in the dense XNN may differ from that of a sparse XNN in that the nodes in one layer are fully connected to each node in another layer, even if the connection is via a zero-value weight, or coefficient as represented by the ruleset. For example, each node in the transformed feature layer 500 is connected to each rule output value in the resulting rule 306 in the next layer.

The difference between a sparse and a dense XNN may be the way the dot product is calculated. For example, in a dense XNN, although the exemplary diagram shows two separate steps 306 and 308 for visual purposes, may actually perform this as one step. In this exemplary step 306/308, matrix multiplication is performed between the weight/coefficient matrix and the vector/matrix of inputs/transformed values 500. The intercept of the equation may also be represented as a separate vector of biases.

Alternatively, in a sparse XNN, the dot product may be split into multiple dot products 306 and combined into one layer 308. Each rule is calculated separately, using a separate dot product, in step 306.

Finally, the prediction network of the sparse XNN may concatenate the output vectors into one vector 308 [R0, R1, R2, R3] so that matrix multiplication could be applied with the switch output 700.

Like a sparse XNN, a dense XNN may still support rule refinement through incremental learning with gradient descent methods such as back propagation. However, the network architecture of dense XNNs may be simpler to construct as compared to the sparse XNNs. Dense XNNs may be ideal for high-powered hardware, rules with non-zero-valued coefficients and for implementing or analyzing high dimensional data. Dense XNNs may be efficient for GPU processing and are ideal for both small and large datasets. Sparse XNNs may be useful for restricting training with regularization while dense XNNs may be useful for serving predictions and explanations. The sparse XNN enables the XNN to take advantage of the regularization and compression which is already part of the XAI model. Once the model is fully trained, it may then be useful to convert the sparse XNN model to a dense XNN model in order to deploy in a production environment whereby a simpler architecture is needed in order to serve fast classifications and explanations. It may also be noted that in this embodiment, Sparse XNN and Dense XNN provide different level of accuracy. In this scenario, hardware resources may be sacrificed to increase model performance (accuracy), as needed. Such trade-offs may be applied on a case-by-case basis. Sparse networks may be useful in scenarios when the ruleset may have been pruned, regularized or compressed to eliminate non-important features and/or coefficients for better generalization. In this scenario, a sparse network is more suitable as it maintains the compression or regularization. The white-box components of an INN may utilize similar compression techniques employed by XNNs.

The exemplary dense XNN illustrated in FIG. 14 is logically equivalent to the following system of equations:

$$f(x, y) = \begin{cases} \text{Sigmoid}\begin{pmatrix} \beta_{0,0} + \beta_{1,0} x + \beta_{2,0} y + \\ \beta_{3,0} x^2 + \beta_{4,0} y^2 + \beta_{5,0} xy \end{pmatrix}, & x \leq 10 \\ \text{Sigmoid}\begin{pmatrix} \beta_{0,1} + \beta_{1,1} x + \beta_{2,1} y + \\ \beta_{3,1} x^2 + \beta_{4,1} y^2 + \beta_{5,1} xy \end{pmatrix}, & x > 10 \land x \leq 20 \\ \text{Sigmoid}\begin{pmatrix} \beta_{0,2} + \beta_{1,2} x + \beta_{2,2} y + \\ \beta_{3,2} x^2 + \beta_{4,2} y^2 + \beta_{5,2} xy \end{pmatrix}, & x > 20 \land y \leq 15 \\ \text{Sigmoid}\begin{pmatrix} \beta_{0,3} + \beta_{1,3} x + \beta_{2,3} y + \\ \beta_{3,3} x^2 + \beta_{4,3} y^2 + \beta_{5,3} xy \end{pmatrix}, & x > 20 \land y > 15 \end{cases}$$

A dense network is logically equivalent to a sparse network after zeroing the unused features. Therefore, to convert a sparse XNN to a dense XNN, additional features may be added which are multiplied by coefficient weights of 0. Additionally, to convert from a dense XNN to a sparse XNN, the features with coefficient weights of 0 are removed from the equation.

For example, the dense XNN in FIG. 14 is logically equivalent to the following system of equations:

$$f(x, y) = \begin{cases} \text{Sigmoid}\begin{pmatrix} \beta_{0,0} + \beta_{1,0} x + \beta_{2,0} y + \\ 0x^2 + 0y^2 + \beta_{4,0} xy \end{pmatrix}, & x \leq 10 \\ \text{Sigmoid}\begin{pmatrix} \beta_{0,1} + 0x + 0y + \\ 0x^2 + 0y^2 + \beta_{5,1} xy \end{pmatrix}, & x > 10 \land x \leq 20 \\ \text{Sigmoid}\begin{pmatrix} \beta_{0,2} + 0x + 0y + \\ \beta_{3,2} x^2 + \beta_{4,2} y^2 + 0xy \end{pmatrix}, & x > 20 \land y \leq 15 \\ \text{Sigmoid}\begin{pmatrix} \beta_{0,3} + 0x + \beta_{2,3} y + \\ 0x^2 + 0y^2 + 0xy \end{pmatrix}, & x > 20 \land y > 15 \end{cases}$$

Which can be simplified to:

$$f(x, y) = \begin{cases} \text{Sigmoid}(\beta_0 + \beta_1 x + \beta_2 y + \beta_3 xy), & x \leq 10 \\ \text{Sigmoid}(\beta_4 + \beta_5 xy), & x > 10 \land x \leq 20 \\ \text{Sigmoid}(\beta_6 + \beta_7 x^2 + \beta_8 y^2), & x > 20 \land y \leq 15 \\ \text{Sigmoid}(\beta_9 + \beta_{10} y), & x > 20 \land y > 15 \end{cases}$$

The logical equivalence applies to the feed forward pass. Once a network is converted to a dense XNN, and training is applied to it, zero-valued weights (i.e., coefficients) may be updated through backpropagation.

When having INNs which are logically equivalent to XNNs, INNs may also be processed in a distributed manner. Distributed XNN/INN, like ensemble methods, may split a dataset into multiple subsets in order to train multiple XNNs on multiple datasets. The main difference between ensemble methods and Distributed XNNs/INNs is that aggregation of models is done as part of the training process, rather when serving predictions. This is possible since all models are inherently white-box and may have a similar structure, which enables the aggregation to be calculated as one single model, making it logically equivalent to calling multiple models and then aggregating the results. Ensemble methods may include models of different structures, such as random forest classifiers, which may train multiple decision trees of different structures to get to the final result.

In an exemplary embodiment, INNs can also utilize multiple explainable models to fuse answers, model explanations and justifications coming from one or more models including but not limited to models hosted locally, remotely, via a number of data transmission networks, on the edge, and embedded systems, which are further deployed as a single or distributed model, or as ensembles. In an exemplary embodiment, INNs can utilize an ensemble of explainable models or other suitable distributed system to improve performance in parallel or on suitable deployment architectures, such as cloud computing systems. In an exemplary embodiment, INNs can utilize a distributed parameter server, and switch between Map-Reduce and All-Reduce strategies to improve performance in parallel implementations.

In an exemplary embodiment, an INN may use a suitable computational and knowledge representation structure as the basis of its constraint and predictive logic implementation. Such a suitable structure may be a Resource Description Framework (RDF) tree, RDF graph, or other suitable form of graph structure. It is further contemplated that a hypergraph structure or a simplicial complex may be used in a practical INN implementation, with one or more partitions being based on the hypergraph structure and/or the simplicial complex.

Figure 15:
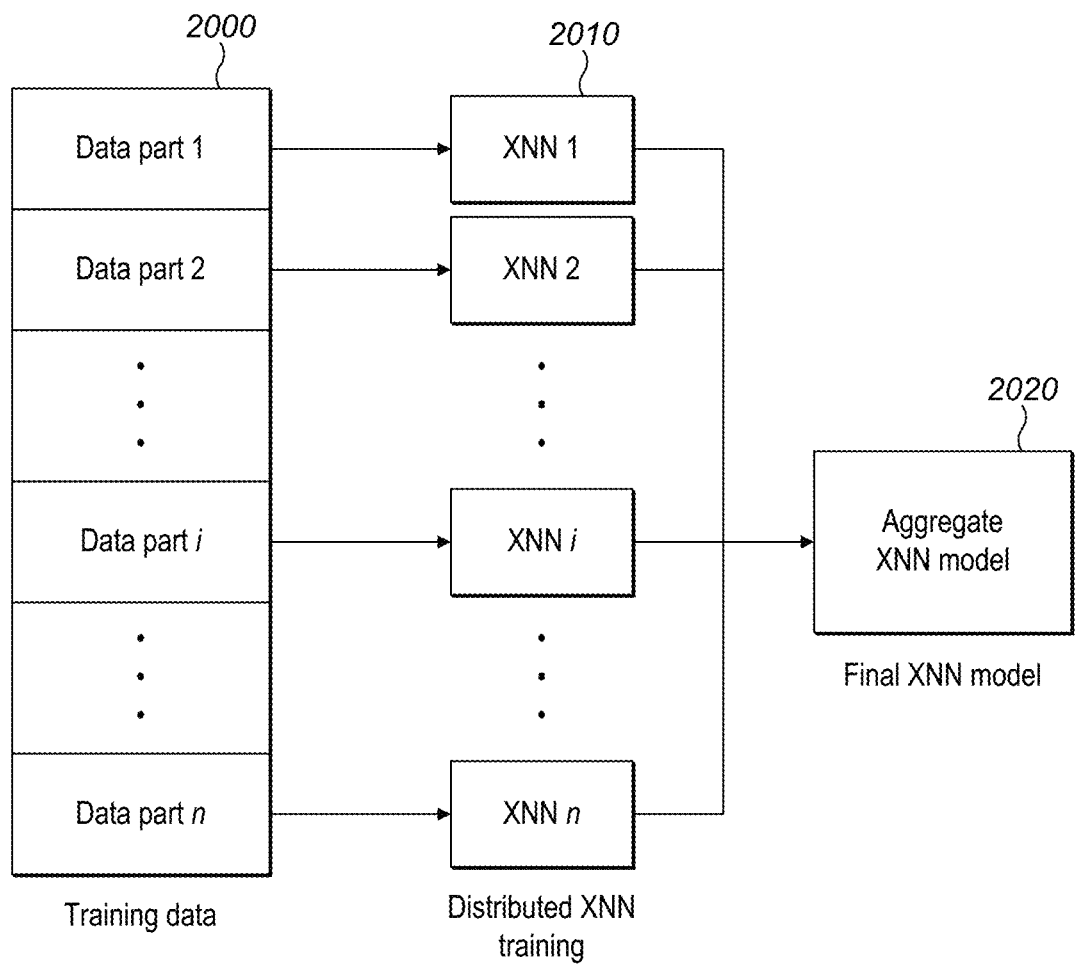
FIG. 15 is an exemplary schematic flowchart illustrating a distributed neural network architecture.
Figure 16:
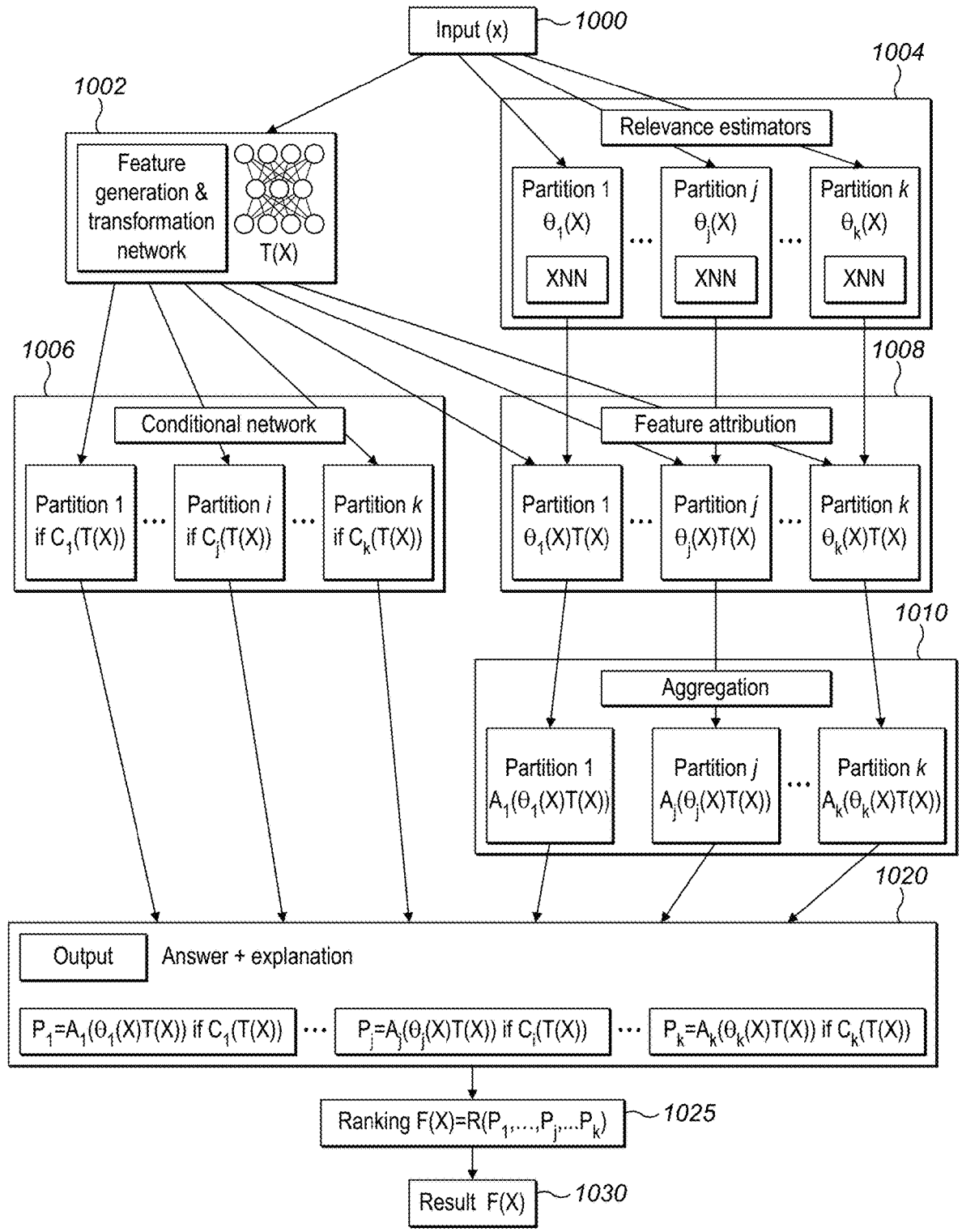
FIG. 16 is an exemplary schematic flowchart illustrating an INN with XNN-based relevance estimators.

Referring now to the exemplary schematic flowchart in FIG. 15, a high-level architecture of a distributed XNN training system may be illustrated. The data parts 2000 may be input to a number of XNNs. The result may then be combined to create the aggregate XNN model 2020. It is contemplated that an exemplary embodiment of an INN using distributed implementation may use a distributed XNN, an/or ensemble method as illustrated in FIG. 15, or a suitable equivalent.

In a typical application of INNs, the exemplary pipeline in FIG. 18 is envisaged to utilize INNs to implement a combination of the Explainable or Interpretable System/Model 904, the Explainer 908, the Interpreter 912, and the optional Filter 911.

In another exemplary embodiment, an INN may be implemented within an Explanation and Interpretation Generation System (EIGS), allowing the EIGS to utilize INNs within its Explanation Filter Interpretation (EFI) system.

In an exemplary embodiment, an INN may implement audit log functionality. An exemplary application of such INN audit log information is in the creation of decision logs and path traces that clearly illustrate the flow, interactions and behavior of the INN and its conditions, events, triggers and actions and overall dynamics. It is contemplated that path traces may be implemented in expert systems and rule-based systems as an annotated sequence of rules that have been triggered and executed. It is further contemplated that path traces may be implemented in workflow systems as an annotated sequence of workflow nodes and paths that have been executed by the workflow engine. The path trace can be used to illustrate the precise sequence and behavior of the INN and may be implemented and configured to display nearest neighbors along the path that may be of interest to the user.

It is further contemplated that an INN may utilize its own audit system log that can be stored in a system of record, DLT, database, or some other suitable system in a tamper-proof and traceable manner. Such audit information may be either stored in an independent system that is separate from the associated AI model or share the same audit system used by its associated AI model.

In an exemplary embodiment, an INN may be implemented and verified by on a combination of systems based on one or more of the Temporal Logic of Actions, Abstract Machine Notation, Petri Nets, Computation Tree Logic, and other suitable implementation methods that can formally represent modal logics, intuitionistic logics, and/or relational semantics, including but not limited to Kripke semantics and/or Alexandrov topologies.

In an exemplary embodiment, an INN may be incorporated within a workflow system that reads from the INN and writes back to the INN, including both processing data and event data. It is further contemplated that such INN and workflow combination may be further integrated within a Robotic Process Automation (RPA) system, Decision Support System (DSS), Data Analytics or a Data Lake system.

INNs can also be extended and enriched with the addition of items such as taxonomical information, links to internal and external taxonomies, ontological information, links to internal and external ontologies, bias detectors, and also seamlessly integrated with knowledge bases and rule systems, all of which is impossible to do with existing approaches that are all black-box methods. INNs can also form part of a causal logic induction system that can extract higher level concepts and link them to a causal model, which is something that is completely impossible to do with a standard black-box neural network. INNs can link causal effects not just at the output layer but also within their internal layers, giving unique capabilities to the INN architecture that allow AI systems using INNs to achieve knowledge, understanding, and advanced reasoning capabilities outside the reach of deep-learning based systems and machine learning techniques that do not fully support the entire range of first-order logic rules and assertions. Casual INNs (C-INNs) extend INNs to integrate with causal logic models giving the explanations the power of causality. C-INNs can incorporate casual logic models as part of the prediction network in an INN. Alternatively, INNs and/or C-INNs output may also be incorporated as part of the input in a causal logic model to form another variant of C-INNs. C-INNs can also utilize a causal logic model to create explanations that take causality into effect, thus providing an explanation that goes beyond a simple description of a particular scenario, opening up a new range of explanations that give a chain of cause-and-effect scenarios and reasons. C-INNs are also capable of generating explanations that have a what-if but also a what-if-not and but-for nature. For example, a C-INN can be used to generate a medical diagnosis for a particular condition but also explain the cause-and-effect of that diagnosis. Using the what-if-not capabilities of causal logics the resulting explanations can cover not just what the system has detected but also the reasons for exclusions of other potential symptoms or diagnoses. Such what-if and what-if-not capabilities do not need the use of twin network techniques, as the rule based system within an INN and the neuro-symbolic basis of INNs provide an efficient alternative solution to the implementation of suitable causal logics including a combination of Pearl's structural causal models and associated derivations and variations, dynamic causal models and associated Bayesian model comparison methods and variations, granger causal models, relativistic causal models arising from special and general relativity, and other suitable implementations that allow machine learning to represent cause-and-effect.

FIG. 8 illustrates the output of a C-INN in an AI-driven HR application that is used to predict salary income levels for different bank loan applicants. The output is an Explanation Structure Model (ESM) which combines statistical, causal, and symbolic knowledge together with one or more explainable models. Dependencies and interactions between variables in the model and the explanation itself are clearly delineated in a summarized group. Choices for enumerated/categorical variables (denoted by curly brackets) are also identified automatically. Ellipsis is used to summarize unnecessary information from the ESM, as determined via appropriate information such as attribution scores or other measures of feature importance and/or feature interaction importance, strength, or weakness. Anchor terms are denoted by bold lines around the variables, signifying their importance within the application domain. Named labels can be associated with ESM variables and then substituted for the variable itself, for example, as in the case of "Work class='Self-Employed'", which then becomes substituted by the named label "Self Employed". This named label substitution is analogous to a-conversion in Lambda calculus and similar notations. Interventions and related statistical conditioning are denoted by an underlined variable and the presence of the "=" symbol and is analogous to interventions in Pearl's causal calculus. For example, in FIG. 8, the C-INN is outputting an ESM for an applicant with a Masters degree of education who is self-employed and works in sales. Furthering the example, the C-INN may detect the presence of a confounder, namely Hours per week, that may create a spurious association between self-employment and education level. Confounding is a causal concept that cannot be described in terms of statistical correlations or association. The ESM in FIG. 8 cannot be processed correctly by any AI system that does not have inbuilt structural support for causal logic and is a key difference between INNs, XNNs, and other explainable models that support causal logic and those that do not.

In an exemplary embodiment, a C-INN can be combined with an XRL system to create systems that can anticipate and act in a physical (or simulated) world, explain themselves and also provide automatic input to the XRL simulation system that further improves the performance of the combined system as a whole. For example, a combined C-INN and XRL system may be used in the previously mentioned warehouse application to detect that a particular type of box keeps falling from a forklift, then using the C-INN to provide the right parameters to simulate the right amount of pressure increase or decrease or different change in the procedure commands for picking up such particular type of box, and then subsequently using the results of that simulation to update the XRL system. Real world feedback from the next similar case encountered would then lead to further iterative improvements, as happens similarly with humans as they learn from real life experiences. The combination of C-INNs and XRL allows agent-based and reinforcement learning (RL) based AI systems to explain themselves, learn from the explanations and the overlying causal model, and then adapt automatically with minimal or no supervision.

Explainable Auto-Encoders (XAE) and Auto-Decoders (XAD) or combined Explainable Auto-Encoders/Decoders (XAED) can extend the INN architecture concept to auto-encoders and auto-decoders. Thus, explanations may be generated, processed and be incorporated in the encoding and decoding processes. An XAE or XAD system may utilize the INN explanation output as part of its auto-encoding or auto-decoding processing pipeline, giving the system additional capabilities beyond a standard auto encoding (AE) or auto-decoding (AD) system. For example, an XAE system can utilize explanations to do more efficient dimensionality reduction and generalization of an input stream of data by taking the similarity of explanations into account.

Explainable Generative Adversarial Networks (XGANs) extend the INN architecture concept to Generative Adversarial Networks (GANs) enabling explanations to be generated, processed and be incorporated in the encoding and decoding processes. Exemplary embodiments of XGANs that utilize INNs instead of standard neural networks giving rise to explainability or some element of interpretability for both the generator and the discriminator. An XGAN utilizes an INN in either the generator or discriminator or in both parts of a GAN system. The advantage of an XGAN over a standard GAN is that the explanation information present in an INN becomes available in a generative adversarial system, allowing the XGAN to have more complex behavior beyond what a GAN can do. For example, in an XGAN application that tries to detect anomalies efficiently over a telecoms network by generating potential examples of anomalous situations, the explanations can be used by the discriminator to distinguish between true and false alarms more efficiently than in the case when no explanations are available.

Predictive and Recurrent INNs (PR-INNs) add an element of time and/or sequence to the input and/or to the output. PR-INNs can match an input sequence and identify its trend and other sequence-based characteristics and relationships while outputting and forecasting possible outputs together with the explanation for each possible output. Output results may include a single value or similar output or another sequence that may be shorter or longer than the input query. PR-INNs may utilize recurrence in the explanation and may have parts of the explanation refer to itself in a modular manner in a linear or non-linear manner. The specific type of predictive architectures may give rise to different variants of PR-INNs, for example a long short-term memory unit (LSTM) PR-INN or a gated recurrent unit (GRU) PR-INN.

PR-INNs add contextual positional information in the conditional and prediction networks of an INN. This contextual positional information may also form part of the output if required, depending upon the specific application and implementation. The contextual positional information may also be added to the matched answer and explanation pairs, as it may be necessary to precisely distinguish PR-INN output as part of a sequence of output items rather than a single output item.

PR-INNs may have some form of recurrence relations in the feature transformation network or within the relevance estimation network and to a lesser extent may also need recurrence relations in the conditional network.

It may be contemplated that a practical implementation may completely replace the original black-box model, for example, the LSTM model may be implemented as part of the PR-INN; or alternatively, the original LSTM may be placed within the feature transformation and relevance estimation network of an INN to create a PR-INN. Alternatively, an LSTM may be placed prior to the entire INN network. When the original LSTM predictor is placed before the input layer of an INN, the resulting PR-INN will treat the output of the original predictor as a sequence of input features, just like any other black-box predictor model that is induced to an INN. When the original predictor model is placed after the input layer of an INN, the resulting PR-INN may have extra data that ensures that any explanation coefficients or feature attributions are passed through the predictor model.

PR-INNs can also incorporate an LSTM or similar model after the output layer, allowing the LSTM to learn to predict the explanation itself. Such a combination of LSTMs or other similar models with PR-INNs can lead to efficient new systems that not only generate an explanation from a single data item and/or ordered or unordered sequence of data items, but also be capable of predicting possible explanations. This capability of PR-INNs makes them particularly suitable for industrial applications that need to anticipate the consequences of planned actions prior to actually executing them. It is further contemplated that PR-INNs can also incorporate a Transformer, or an XTT, or a similar model instead of an LSTM.

PR-INNs can be implemented as a distributed system, as with non-predictive INNs. Distributed implementations and embodiments also have an advantage in that they can mix different types of models and systems together in an ensemble or mixture of machines/expert systems that optimizes the re-use of various models in a modular fashion. Distributed implementations are also highly suitable for the integration of software and hardware implementations in a cohesive embodiment.

For example, in an industrial robotics manufacturing application involving a robot arm, the predicted explanations for a set of movement commands can be used to determine whether such movement commands will lead to an unsafe situation for any human operators, living objects or inanimate equipment that may be in the proximity of such robotic arm. PR-INNs can thus open up a new set of capabilities in industrial and commercial and non-commercial applications that allow safety to be part of the control loop of automated machinery, apparatus, and systems.

Another example of the practical implementation and advantages of a PR-INN is to anticipate the behavior and subsequent consequences of an autonomous vehicle including but not limited to autonomous air, land, sea, underwater and space indoor and outdoor vehicles. Using a PR-INN, an autonomous driverless car, for example, may determine that in one of its anticipated future explanations there is a reference to a child or adult being potentially hit by the driverless car. When the safety control system in the driverless car detects anticipated references, it may take an appropriate safety related action, such as to switch the car to a safer driving mode, or slow down, or turn on some higher resolution sensor to better resolve the future possibilities prior to them actually happening. PR-INNs may allow practical systems to safely operate automated machinery based on the anticipation and prediction of consequences. The ability to guarantee a safe mode of operation of machinery and robots, especially machinery and robots which interact with people, is a major unresolved problem which PR-INNs may solve to a large extent.

PR-INNs can be combined with a Behavioral Model (BM) or Behavioral Model Hierarchy (BMH) and their inherent safety mechanisms to provide a complete solution that is robust, explainable, and trustworthy due to its transparency and interpretability. In an exemplary embodiment, an INN or a PR-INN may utilize a BM and/or BMH to provide assurances and guarantees of behavior that are verifiable through formal and empirical means.

A named reference label may be assigned to particular components within an explainable or interpretable model. An example of a named reference label is given in FIG. 8, where the named label "Self-employed" may be simultaneously associated with a neuro-symbolic variable or a specific node in an INN. Named reference labels may be descriptive in nature and may also contain additional meta-data and links to external taxonomies, ontologies, and models. A named reference label may include symbolic expressions and/or formulas of the form of conjunctive normal form (CNF), or disjunctive normal form (DNF), or a suitable first order logic, to provide an explanation of the set or sequence of decisions that resulted in the execution of the current component, in the INN, which we refer to as the path trace. An "activation path" may be defined as a data flow path followed by an AI model, starting from a particular input, and ending in a particular output prediction. The path trace is set or sequence of decisions, nodes, transitions, or applicable description structures for the particular AI model describing the activation path.

For example, named reference labels may contain meta-data about multimedia files associated with that named reference label, units and dimensions associated with the explainable model component, and so on. The named reference label itself is a direct form of symbolic reference, that can either be the named reference label text itself or an associated meta-data.

In an exemplary embodiment, the named reference labels themselves may also be used by a suitable model discovery system or model optimization system, such as an exemplary AutoXAI system, to generate human-friendly explanations of dynamical processes that may be otherwise very difficult to explain. It may be further contemplated, the named reference labels may remain invariant throughout such dynamical processes, even though the precise location, connection and relationship between the part and the whole of the relevant named component may change. Such invariance under dynamical processes makes named reference labels an ideal component for use within explanations.

In another exemplary embodiment, the same invariance of named reference labels under dynamical processes may be utilized by an INN to generate stable, long-term explanations of the dynamics occurring within an AI model without having to recode knowledge or retrain explanatory methods with each run of the dynamical process.

The novel use of named reference labels in an exemplary embodiment within behavioral models and their association with evolving AI models that have been modified using a suitable dynamical process, such as AutoXAI, model discovery, or model optimization process, may enable a practical implementation of neuro-symbolic constraints that may apply to some up-stream meta-reasoning layer that has access to the statistical or causal relationships between variables.

Named reference labelling may allow the user to specify which models in the partition are to be modified, deleted, or otherwise prevented from alteration. Named reference labelling also may allow the user to keep track of model candidates that are of particular interest. In a similar manner to nodes, edges can also be named reference labelled.

Named reference labels may also be used to integrate explainable and/or interpretable AI models and INNs with neuro-symbolic AI systems that can utilize symbolic rule expressions and be used to perform automated symbolic checks and verification that is impossible to do with a black-box AI system In an exemplary embodiment, an INN may be used as the basis or part of a practical data privacy preserving AI system implementation. Data privacy may be violated intentionally or unintentionally by AI systems in a number of scenarios: (i.) personal data from training datasets unintentionally incorporated in AI models; (ii.) personal data can be re-extracted or re-created by analyzing the model answers repeatedly; (iii.) personal data of certain uniquely identifiable groups may end up at a higher risk of identification; (iv.) model inversion and membership inference techniques, that can associate model data via a unique key or signature; (v.) other sources of information, such as public data sources, which may be combined with private information, may re-create or otherwise identify private information. The main data privacy preserving solutions for AI can be classified under four categories: (i.) differential privacy; (ii.) secure multi-party computation; (iii.) federated learning; (iv.) homomorphic encryption. Exemplary embodiments of INN systems may enable practical implementations under all four categories.

In an exemplary privacy preserving solution (i.), differential privacy, the introduction of noise in the training data or some other suitable means of obfuscation, may be used to generate a controllable amount of privacy through a noise factor or ratio, in the INN. The noise level may be a variable which the user may be able to supply or edit, where the noise level may be implemented as a constraint and/or objective. In privacy preserving solution (ii.), secure multi-party computation (SMPC) may be used to obtain a correct answer while concealing partial information about data and may simultaneously compute the answer using data from one or more sources. Exemplary embodiments of INNs and explainable/interpretable models may extend SMPC protocols to apply to explanation generation apart from answer output. It is further contemplated that exemplary embodiments of INNs can be analyzed and tested formally for security and trust building purposes without revealing any private information. A secure enclave may also be used to decrypt the data in a protected space within the hardware processor, limiting the possibility that other parts of the system can access such data in clear text. An end-to-end hardware implementation of an INN system with a secure enclave may be rather resilient to most forms of data attacks. In privacy preserving solution (iii.), federated learning, an INN may be distributed across various decentralized devices that hold only local data samples. The local data samples are not shared with other devices, thus limiting, but not completely eliminating, the privacy risk involved, and may be particularly suitable for IoT or edge computing applications where messaging options are limited or constrained by the network topology, such as in a mesh network. In privacy preserving solution (iv.), homomorphic encryption, or homomorphic computing may be used to allow computation on encrypted data without either decrypting the data and also, optionally, using encrypted explainable models. In an exemplary embodiment of an INN using homomorphically encrypted data and a homomorphically encrypted INN, utilizing the CKKS protocol, a secret key and a public key are generated. The public key is used for encryption and can be shared, while the private key is used for decryption and must be kept secret, for example, in a secure hardware enclave or similar implementation solution.

In an exemplary embodiment, an INN implemented on quantum computing hardware, also referenced to as a Quantum INN, may utilize suitable quantum algorithms, such as those based on quantum Fourier transforms, amplitude amplification, quantum walks and so on. In an exemplary Quantum BM embodiment, the Bernstein-Vazirani, Simon's algorithm or the Deutsch-Jozsa algorithm is utilized to predict and refine the boundary conditions of the INN rules together with the prediction network. In another exemplary Quantum BM embodiment, Shor's algorithm, Quantum Phase estimation algorithm, Grover's algorithm, Quantum Counting, Quantum Hamiltonian NAND trees, or the HHL algorithm may be used to speed up the constraint, condition, event, and trigger parts of Quantum INNs including the conditional network. In another exemplary Quantum INN embodiment, a hybrid solution may be utilized, such as the QAOA algorithm, VQE eingensolver, CQE eingensolver, and quantum matrix inversion to speed up part of the processes involved, for example by using Gaussian estimation processes, or linear system of equations solvers that utilize quantum processing to give faster results.

In an exemplary embodiment, an INN may have multiple objective criteria measures based on model performance, bias reduction, risk management, and other relevant criteria. The combination of multiple criteria measures may be normalized by expressing the total paths from the root as 1 and the rest of the paths as a fraction of the total score bounded between [0 . . . 1]. It is contemplated that a node discovery process in an INN may use game theory to discover the optimal nodes for the selected combination of criteria measures. It is further contemplated that alternative methods such as Multiple Objective Optimization (MOO), Pareto Front Methods, Particle Swarm Optimization (PSO), Genetic Algorithms (GA), Bayesian Optimization, Evolutionary Strategies, Gradient Descent techniques and Monte Carlo Simulation (MCS) may be used to discover optimal nodes for a given desired combination of criteria measures. It is further contemplated that such methods may be employed in an AutoXAI system that utilizes INNs.

In an exemplary embodiment, an INN may have multiple inputs corresponding to one or more tasks that are associated with one or more input features and have multiple outputs corresponding to the outputs for those tasks. The semantic notion of tasks in an INN context is merely implemented by designating some input features as task identifiers and task meta-data input features without needing any change in the INN structure itself. The hierarchical partition structure, which may be a tree, graph, hypergraph or simplicial complex structure, allows for crossover between different knowledge learnt for the different tasks to occur efficiently. Such crossover occurs within the INN prediction network, which caters for feature interactions within the hierarchical partition structure. The INN conditional network may be used to select, orchestrate and multiplex the correct path trace through the partition structure linking the task, its associated inputs and associated outputs. It is contemplated that a denser or sparse INN may be utilized to implement parts of the partition structure in an energy efficient manner. It is further contemplated that a distributed INN or a DEA may be used to implement parts of the partition structure in a practical manner.

The foregoing description and accompanying figures illustrate the principles, preferred embodiments, and modes of operation of the invention. However, the invention should not be construed as being limited to the particular embodiments discussed above. Additional variations of the embodiments discussed above will be appreciated by those skilled in the art (for example, features associated with certain configurations of the invention may instead be associated with any other configurations of the invention, as desired).

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A system for providing an interpretable neural network embodied on a non-transitory computer readable medium, comprising:
    an input;
    a feature generation network configured to identify a plurality of features from the input;
    a plurality of relevance estimators, each relevance estimator configured to calculate a coefficient associated with one or more features of the input;
    a conditional network configured to evaluate a plurality of rules, each rule comprising at least an IF-condition, wherein each IF-condition activates one or more partitions, each partition comprising one or more features;
    a feature attribution layer provided downstream of the plurality of relevance estimators and configured to, based on the coefficient associated with the one or more features of the input, calculate an attribution value of the features associated with the partitions activated by the conditional network;
    an aggregation layer configured to aggregate a plurality of predictive results for each of the activated partitions, into a partition hierarchy comprising a plurality of hierarchical partitions, the hierarchical partitions comprising at least one pair of overlapping hierarchical partitions and at least one pair of non-overlapping hierarchical partitions, wherein the aggregation layer is configured to aggregate the plurality of predictive results by merging at least one pair of hierarchical partitions and splitting at least one hierarchical partition, wherein aggregation further comprises aggregating the plurality of relevance estimators; and
    an output layer configured to provide an output comprising an answer and explanation based on the predictive results and activated partitions;
    wherein the system is configured to simultaneously compute, in a single feed-forward step extending from the input to the output without iteration of intervening steps, the answer and explanation;
    wherein the answer comprises a response provided by the interpretable neural network to the input, and wherein the explanation comprises a set or sequence of decisions performed from the input to the output as part of the single feed-forward step.

2. The system for providing an interpretable neural network of claim 1, wherein the plurality of relevance estimators and/or the feature generation network are formed from a black-box model.

3. The system for providing an interpretable neural network of claim 1, wherein the partitions are static or dynamic and discovered through an external partitioning process or through a connected neural network.

4. The system for providing an interpretable neural network of claim 1, wherein the feature generation network further comprises a transformation network configured to apply one or more transforms to an input vector of the input to identify the features.

5. The system for providing an interpretable neural network of claim 1, wherein the system comprises one partition, wherein a transformation function and the plurality of relevance estimators each comprise a deep neural network, and wherein the one partition models non-linear data.

6. The system for providing an interpretable neural network of claim 1, wherein the aggregation layer is further configured to weight the plurality of predictive results from each of the activated partitions.

7. The system for providing an interpretable neural network of claim 1, wherein the partitions comprise one or more of linear partitions, Bayesian partitions, curvilinear partitions, continuous partitions, non-continuous segmented partitions, Bezier curve segments, graph-based partitions, hypergraph-based partitions, and simplicial complex partitions.

8. The system for providing an interpretable neural network of claim 1, wherein the partitions comprise one or more static partitions and one or more dynamic partitions.

9. The system for providing an interpretable neural network of claim 1, wherein the rules comprise causal logic and one or more of abductive logic, inductive logic, and deductive logic.

10. The system for providing an interpretable neural network of claim 9, wherein the output is in at least one of a computer-readable programming language and a machine-readable hardware circuit specification.

11. The system for providing an interpretable neural network of claim 1, wherein one or more of the feature generation network, conditional network, and/or feature attribution layer are implemented on one or more of: a flexible architecture or field-programmable gate array, a static architecture or an application-specific integrated circuit, analogue/digital electronics, discrete components, photo-electronic components, spintronics and neuromorphic architectures, spiking neuromorphic architectures or quantum computing hardware.

12. The system for providing an interpretable neural network of claim 1, wherein one or more of the feature generation network, conditional network, and/or feature attribution layer are implemented as a spiking network comprising a plurality of spiking neurons.

13. The system for providing an interpretable neural network of claim 1, further comprising an identify-assess-recommend-resolve framework configured to identify bias, wherein the identify-assess-recommend-resolve framework comprises a goal-plan-action system.

14. The system for providing an interpretable neural network of claim 1, wherein the output further comprises an explanation structure model, and wherein at least one of the output and the explanation comprises at least one of a human-readable explanation and a machine-readable explanation.

15. The system for providing an interpretable neural network of claim 1, further comprising at least one data privacy subsystem, the data privacy configured to perform at least one of:
- a differential privacy solution comprising introducing, to the input, prior to the input being supplied to the feature generation network for identification of the plurality of features from the input, data noise based on a noise level;
- a secure multi-party computation solution comprising performing secure multi-party computation of at least one function of the system;
- a federated learning solution comprising retaining, in a plurality of distributed locations, only a portion of data samples provided in the input, said plurality of distributed locations comprising at least a first distributed location having a first data sample and not a second data sample and a second distributed location having the second data sample and not the first data sample; and
- an encryption solution comprising introducing, to the input, prior to the input being supplied to the feature generation network for identification of the plurality of features from the input, homomorphic encryption, and wherein the feature generation network is configured to identify the plurality of features from a homomorphically-encrypted input.

16. The system for providing an interpretable neural network of claim 1, wherein the rules are in one or more of: disjunctive normal form, conjunctive normal form, first-order logic assertions, non-Boolean logical systems, Type 1 or Type 2 fuzzy logic systems, modal logic, quantum logic, and probabilistic logic.

17. The system for providing an interpretable neural network of claim 1, wherein the rules further comprise neuro-symbolic constraints comprising one or more of symbolic expressions, polynomial expressions, conditional and non-conditional probability distributions, joint probability distributions, state-space and phase-space transforms, integer/real/complex/quaternion/octonion transforms, Fourier transforms, Walsh functions, Haar and non-Haar wavelets, generalized L2 functions, fractal-based transforms, Hadamard transforms, Type 1 and Type 2 fuzzy logic and difference analysis.

18. The system for providing an interpretable neural network of claim 17, wherein the neuro-symbolic constraints are linked with past data comprising at least one of: a previous historic rate of activations and a set of dynamically-changing Fast Weights.

19. The system for providing an interpretable neural network of claim 1, further comprising at least one of: an explainable transformer-transducer, a long short-term memory unit, and a gated recurrent unit, configured to provide a recursive output and a recursive explanation.

20. A method for providing an interpretable neural network, comprising:
- inputting a set of training data to a black-box predictor model;
- recording an output of the black-box predictor model corresponding to the set of training data;
- with a feature attribution layer, receiving, from a plurality of relevance estimators, a plurality of coefficients associated with one or more features of the set of training data input to the black-box predictor model, and calculating one or more attribution values of the coefficients;
- with an aggregation layer, aggregating the output and forming one or more hierarchical partitions based on the aggregated output, the hierarchical partitions comprising at least one pair of overlapping hierarchical partitions and at least one pair of non-overlapping hierarchical partitions, wherein the aggregation layer is configured to aggregate the output by merging at least one pair of hierarchical partitions and splitting at least one hierarchical partition, and wherein aggregating the output further comprises aggregating the plurality of relevance estimators;
- applying at least one linear or non-linear transformation to the partitions to form one or more local models;
- constructing rules based on the local models; and
- aggregating the rules to form a global interpretable model configured to simultaneously compute, in a single feed-forward step extending from the input to the output without iteration of intervening steps, an answer and an explanation;
- wherein the answer comprises a response provided by the interpretable neural network to the input, and wherein the explanation comprises a set or sequence of decisions performed from the input to the output as part of the single feed-forward step.

21. The method for providing an interpretable neural network of claim 20, further comprising monitoring for one or more constraints and expressions, wherein the constraints and expressions comprise one or more conditions, events, triggers and actions in the form of one or more of symbolic rules or system of symbolic expressions, polynomial expressions, conditional and non-conditional probability distributions, joint probability distributions, state-space and phase-space transforms, integer/real/complex/quaternion/octonion transforms, Fourier transforms, Walsh functions, Haar and non-Haar wavelets, generalized L2 functions, fractal-based transforms, Hadamard transforms, Type 1 and Type 2 fuzzy logic and difference analysis.

22. The method for providing an interpretable neural network of claim 21, wherein the monitoring is implemented by a data structure that references one or more features and one or more associated taxonomies, ontologies, causal models, one or more knowledge graph networks, control charts, Nelson rules, Bode plots, or Nyquist plots.

23. The method for providing an interpretable neural network of claim 20, further comprising inputting the output into an explainable auto encoder or explainable auto decoder, and generating explanations using a generative adversarial network.

24. The method for providing an interpretable neural network of claim 20, further comprising training global interpretable model using one or more of transfer learning, Genetic Algorithms, Monte Carlo Simulation Techniques, and Bayesian networks.

25. The method for providing an interpretable neural network of claim 20, further comprising converting global interpretable model to an explainable neural network.

26. The method for providing an interpretable neural network of claim 20, further comprising:
- performing at least one of providing a predetermined list of sources of unacceptable deciding factors including one or more biases applied to personal characteristics and providing a visualization of deciding factors configured to receive a manual markup, and
- detecting bias in the input and/or the global interpretable model or individually detecting bias in one or more partitions.

27. The method for providing an interpretable neural network of claim 20, further comprising extracting high-level concepts from the input and linking the concepts to a causal model, wherein the causal model is incorporated into the global interpretable model, and wherein the output further comprises causal explanations in a what-if, what-if-not, and but-for forms.

28. The method for providing an interpretable neural network of claim 20, further comprising abstracting the explanation based on an abstraction transformation function.

29. The method for providing an interpretable neural network of claim 20, further comprising injecting human knowledge into the rules in a universal representation format wherein the human knowledge is fixed and cannot be updated.

30. The method for providing an interpretable neural network of claim 20, forming a heatmap, feature attribution graph, or textual explanation based on the attribution values identified by the feature attribution layer.

* * * * *